United States Patent
Wada

(10) Patent No.: US 8,582,145 B2
(45) Date of Patent: Nov. 12, 2013

(54) IMAGE PROCESSING APPARATUS AND IMAGE PROCESSING METHOD

(75) Inventor: Ken Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1283 days.

(21) Appl. No.: 12/400,565

(22) Filed: Mar. 9, 2009

(65) Prior Publication Data

US 2009/0225367 A1    Sep. 10, 2009

(30) Foreign Application Priority Data

Mar. 10, 2008    (JP) .................................. 2008-059495

(51) Int. Cl.
*G06F 3/12* (2006.01)

(52) U.S. Cl.
USPC ........ 358/1.15; 358/1.13; 358/1.14; 358/1.18

(58) Field of Classification Search
USPC ....................... 358/1.9, 1.13, 1.15, 1.14, 1.18
See application file for complete search history.

(56) References Cited

U.S. PATENT DOCUMENTS

| | | | |
|---|---|---|---|
| 2002/0021902 A1* | 2/2002 | Hosoda et al. | 396/429 |
| 2003/0210331 A1* | 11/2003 | Battles et al. | 348/211.2 |
| 2004/0210691 A1* | 10/2004 | Fujii | 710/74 |
| 2005/0162695 A1 | 7/2005 | Shiraiwa | |
| 2006/0023237 A1* | 2/2006 | Endo | 358/1.13 |
| 2006/0087669 A1* | 4/2006 | Yamaguchi et al. | 358/1.13 |

FOREIGN PATENT DOCUMENTS

| | | | |
|---|---|---|---|
| JP | 2003018508 A | * | 1/2003 |
| JP | 2005-165107 | | 6/2005 |
| JP | 3728302 | | 12/2005 |

* cited by examiner

*Primary Examiner* — Allen H Nguyen

(74) *Attorney, Agent, or Firm* — Canon USA Inc. IP Division

(57) ABSTRACT

An image processing apparatus includes a switching unit to switch images output to the display apparatus, a storage unit to store image specifying information to specify the multiple images to be printed and the number of copies information specifying the number of copies to be printed, and an output unit to sequentially output the images specified with the image specifying information to the display apparatus, are provided, and if a switching operation is performed when the number of copies information is set as two or more copies of an image displayed, output of the next image specified with the image specifying information is performed without following the number of copies information.

8 Claims, 28 Drawing Sheets

FIG. 4A

401
```
DPS_ConfigurePrintService

<?xml version="1.0">
<dps xmlns="http://www.cipa.jp/dps/schema/">
  <input>
    <configurePrintService>
      <dpsVersions>1.0</dpsVersions>
      <vendorName>DSC_Vendor_200</vendorName>
      <vendorSpecificVersion>1.0</vendorSpecificVersion>
      <productName>DPS_DSC_200</productName>
      <serialNo>ABC01234567</serialNo>
    </configurePrintService>
  </input>
</dps>
```

402
```
<?xml version="1.0">
<dps xmlns="http://www.cipa.jp/dps/schema/">
  <output>
    <result>10000000</result>
    <configurePrintService>
      <dpsVersions>1.0</dpsVersions>
      <vendorName>LCP_Vendor_100</vendorName>
      <vendorSpecificVesrion>1.0</vendorSpecificVersion>
      <productName>DPS_LCP_100</productName>
      <serialNo>ABC01234567</serialNo>
    </configurePrintService>
  </output>
</dps>
```

FIG. 4B

DPS_GetCapability

403

```
<?xml version="1.0">
<dps xmlns="http://www.cipa.jp/dps/schema/">
 <input>
  <getCapability>
   <paperSizes/>
  </getCapability>
 </input>
</dps>
```

404

```
<?xml version="1.0">
<dps xmlns="http://www.cipa.jp/dps/schema/">
 <output>
  <result>10000000</result>
  <getCapability>
   <paperSizes>51000000 51010000 51020000</paperSizes>
  </getCapability>
 </output>
</dps>
```

FIG. 4C

DPS_StartJob
405

```
<?xml version="1.0">
<dps xmlns="http://www.cipa.jp/dps/schema/">
  <input>
    <startJob>
      <jobConfig>
        <quality>50000000</quality>
        <paperSize>51000000</paperSize>
        <paperType>52000000</paperType>
        <fileType>53000000</fileType>
        <datePrint>54010000</datePrint>
        <fileNamePrint>55010000</fileNamePrint>
        <imageOptimize>56000000</imageOptimize>
        <layout>57010000</layout>
        <cropping>59010000</cropping>
      </jobConfig>
      <printInfo>
        <fileID>00000001</fileID>
        <fileName>EFGA001.JPG</fileName>
        <date>2007/04/26</date>
        <copies>001</copies>
      </printInfo>
    </startJob>
  </input>
</dps>
```

406

```
<?xml version="1.0">
<dps xmlns="http://www.cipa.jp/dps/schema/">
  <output>
    <result>10000000</result>
    <startJob/>
  </output>
</dps>
```

FIG. 5A

DPS_NotifyJobStatus
407

```
<?xml version="1.0">
<dps xmlns="http://www.cipa.jp/dps/schema/">
 <output>
  <result>10000000</result>
  <notifyJobStatus/>
 </output>
</dps>
```

408

```
<?xml version="1.0">
<dps xmlns="http://www.cipa.jp/dps/schema/">
 <input>
  <notifyJobStatus/>
   <progress>001/001</progress>
    <imagePrinted>001</imagePrinted>
  </notifyJobStatus/>
 </input>
</dps>
```

FIG. 5B

DPS_NotifyDeviceStatus

409

```
<?xml version="1.0">
<dps xmlns="http://www.cipa.jp/dps/schema/">
 <output>
   <result>10000000</result>
   <notifyDeviceStatus/>
 </output>
</dps>
```

410

```
<?xml version="1.0">
<dps xmlns="http://www.cipa.jp/dps/schema/">
 <input>
   <notifyDeviceStatus>
     <dpsPrintServiceStatus>70010000</dpsPrintServiceStatus>
     <jobEndReason>71000000</jobEndReason>
     <errorStatus>72010000</errorStatus>
     <disconnectEnable>73010000</disconnectEnables>
     <capabilityChanged>74010000</capabilityChanged>
     <newJobOK>75010000</newJobOK>
   </notifyDeviceStatus>
 </input>
</dps>
```

FIG. 5C

DPS_AbortJob

411

```
<?xml version="1.0">
<dps xmlns="http://www.cipa.jp/dps/schema/">
 <input>
   <abortJob>
     <abortStyle>90010000</abortStyle>
   </abortJob>
 </input>
</dps>
```

412

```
<?xml version="1.0">
<dps xmlns="http://www.cipa.jp/dps/schema/">
 <output>
   <result>10000000</result>
   <abortJob/>
 </output>
</dps>
```

FIG. 5D

DPS_ContinueJob

413

```
<?xml version="1.0">
<dps xmlns="http://www.cipa.jp/dps/schema/">
  <input>
    <continueJob/>
  </input>
</dps>
```

414

```
<?xml version="1.0">
<dps xmlns="http://www.cipa.jp/dps/schema/">
  <output>
    <result>10000000</result>
    <continueJob/>
  </output>
</dps>
```

FIG. 6A

DPS_GetFileID

420

```
<?xml version="1.0">
<dps xmlns="http://www.cipa.jp/dps/schema/">
 <output>
   <result>10000000</result>
   <getFileID>
     <fileID>00000003<fileID>
   </getFileID>
 </output>
</dps>
```

421

```
<?xml version="1.0">
<dps xmlns="http://www.cipa.jp/dps/schema/">
 <input>
   <getFileID>
     <basePathID>00000002</basePathID>
     <filePath>../DCIM/100ABCDE/FGHI0001.JPG</basePathID>
   </getFileID>
 </input>
</dps>
```

FIG. 6B

DPS_GetFileInfo
422

```
<?xml version="1.0">
<dps xmlns="http://www.cipa.jp/dps/schema/">
 <output>
   <result>10000000</result>
   <getFileInfo>
    <fileType>53010000<fileType>
    <fileSize>00012345<fileSize>
    <thumbFormat>53020000<thumbFormat>
    <thumbSize>00006789<thumbSize>
   </getFileInfo>
 </output>
</dps>
```

423

```
<?xml version="1.0">
<dps xmlns="http://www.cipa.jp/dps/schema/">
 <input>
   <getFileInfo>
    <fileID>00000002</fileID>
   </getFileInfo>
 </input>
</dps>
```

```
DPS_GetFile
<?xml version="1.0">
<dps xmlns="http://www.cipa.jp/dps/schema/">
 <output>
  <result>10000000</result>
  <getFile>
   <byteRead>00012345</byteRead>
  </getFile>
 </output>
</dps>
```

425

```
<?xml version="1.0">
<dps xmlns="http://www.cipa.jp/dps/schema/">
 <input>
  <getFile>
   <fileID>00000002</fileID>
  </getFile>
 </input>
</dps>
```

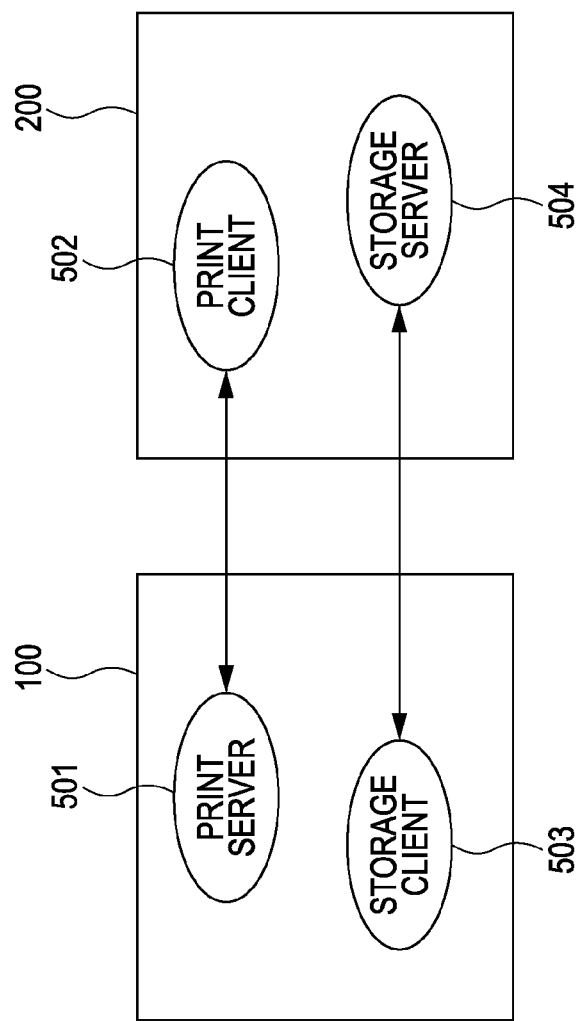

FIG. 9

PRINT SETTING FILE OF CAMERA 200: AUTPRINT.MRK

```
[HDR]
GEN REV = 01.10
GEN CRT = "DSC_200" -01.00
GEN DTM = 2006:01:16:09:02:16

[JOB]
PRT PID = 001
PRT TYPE = STD
PRT QTY = 003
IMG FMT = EXIF2 -J
<IMG SRC = "../DCIM/100ABCD/EFGH0001.JPG">
CFG DSC "12/31/10:38" -ATR DTM

[JOB]
PRT PID = 002
PRT TYPE = STD
PRT QTY = 001
IMG FMT = EXIF2 -J
<IMG SRC = "../DCIM/100ABCD/EFGH0002.JPG">
CFG DSC "12/31/10:43" -ATR DTM
        ;
```
⌐306

IMAGE PROCESSING APPARATUS AND IMAGE PROCESSING METHOD

BACKGROUND OF THE INVENTION

1. Field of the Invention

The present invention relates to an image processing apparatus that sequentially outputs images specified with image specifying information to a display apparatus.

2. Description of the Related Art

An image photographed with a digital camera is recorded on recording media within the digital camera as digital data. The recording media is inserted into a display apparatus such as a projector, whereby photographed images may be displayed such that friends and family can view and enjoy the displayed images (See Japanese Patent Laid-Open No. 2005-165107). Operations such as switching the display image or rotating the display image are performed with a remote controller of the display apparatus.

On the other hand, regardless of manufacturer, a direct printing function may exist wherein the digital camera and printer are directly connected, and printing can be performed by operating the digital camera. As a direct printing function, a standard called PictBridge is commonly used, whereby the digital camera and printer can realize direct printing function by mounting this standard. Recently, a majority of digital cameras have the function corresponding to the PictBridge standard.

With the direct printing function, the image to be printed is displayed on a display unit of the digital camera, and a printing start button or the like is operated, whereby printing of a desired image with the printer currently communicating can be performed.

On the other hand, a user of a digital camera can select a desired image for printing beforehand, and store the selected information as printing reservation information in the memory (see Japanese Patent No. 3,728,302). A standard called DPOF (Digital Print Order Format) is known wherein such printing reservation information is recorded, and many digital cameras as of recent may include a function corresponding to this standard.

At a presentation or photography exhibit or the like, a video signal can be outputted from a personal computer or video device to a display apparatus such as a projector, thereby displaying the image. Let us consider a case wherein image data is to be outputted from the digital camera to a projector or display. A case is assumed wherein images to be publicly displayed and images not intended for public display are mixed within the digital camera. Even in such a case, the images displayed on the display apparatus of the digital camera and on the projector are matched, whereby images not desired to be publicly displayed can be displayed with the display apparatus such as the projector during operation of image switching and so forth.

Accordingly, an arrangement utilizing the direct print function which a majority of models of digital cameras have, to display the desired images only with the display apparatus may be preferred. That is to say, a direct print function is provided on the information processing apparatus that controls the images output to the display apparatus, whereby the images desired to be displayed on the display apparatus can be selected by the printing operation from the image supply apparatus of the digital camera or the like.

However, problems can occur in the case of using direct print function with a connection between the digital camera and the information processing apparatus controlling the image to be outputted to the display apparatus. One problem is the handling of number of copies information which is useful information at time of printing. With direct printing with the digital camera and printer, multiple copy printing of the same image can easily print many images at one time, so number of copies information has been effective. However, if number of copies information is used in the case of a connection between the digital camera and display apparatus such as projector, the same image is displayed numerous times, which may be undesired.

Also, switching the display image is inconvenient. For example, in the case that printing 5 copies is specified, if the same image is repeatedly displayed 5 times according to the number of copies information, the waiting time for displaying the image may increase. Also, in the case that image switching processing is a manual process, the image switching operation has to be operated 5 times in order to display the following image, which may be time consuming.

SUMMARY OF THE INVENTION

The present invention provides a solution to all or at least one of the above-mentioned problems by reducing the inconvenience in the case of providing a display function using the direct print function of the image processing apparatus such as a digital camera. Also, even if multiple copy information is set, the waiting time can be reduced by preventing the same image from repeatedly displaying several times. Further, repeatedly performing image switching and repeatedly displaying the same image can be prevented, thereby improving operability.

According to an embodiment of the present invention, an image processing apparatus includes: a switching unit configured to switch images output to a display apparatus; a storage unit configured to store image specifying information specifying multiple images to be printed and number of copies information to specify the number of copies to be printed; and an output unit configured to sequentially output images specified with the image specifying information stored in the storage unit, to the display apparatus according to the switch processing with the switching unit, and in the case that the switch processing is performed when the number of copies information is set as images for two or more copies, output of the next image is specified with the image specifying information without following the number of copies information.

Further features of the present invention will become apparent from the following description of exemplary embodiments with reference to the attached drawings.

BRIEF DESCRIPTION OF THE DRAWINGS

FIGS. 4A through 4C are diagrams illustrating commands and events according to an embodiment.

FIGS. 5A through 5D are diagrams illustrating commands and events according to an embodiment.

FIGS. 6A through 6C are diagrams illustrating commands and events according to an embodiment.

FIG. 7 is a model diagram of a direct print system according to an embodiment.

FIG. 9 is a description example of the AUTOPRINT.MRK in FIG. 3.

DESCRIPTION OF THE EMBODIMENTS

With the present embodiment, the case wherein a liquid crystal projector and a digital camera are connected via a Universal Serial Bus (USB) is described. By operating the digital camera, images saved in the recording media of the digital camera are played and displayed by the liquid crystal projector. A case is assumed wherein a print job describing number of copy information for multiple copies from the digital camera is transmitted to the liquid crystal projector. The number of copies information instructing such multiple copies is converted to one copy, or the number of copies information is ignored whereby even if a printing request is made for multiple copies, the processing is performed as a one-copy display request.

Note that with the embodiments hereafter, DCIM or PictBridge is used as an example, but a file configuration and printing protocol other than these may be used.

Figure 1:
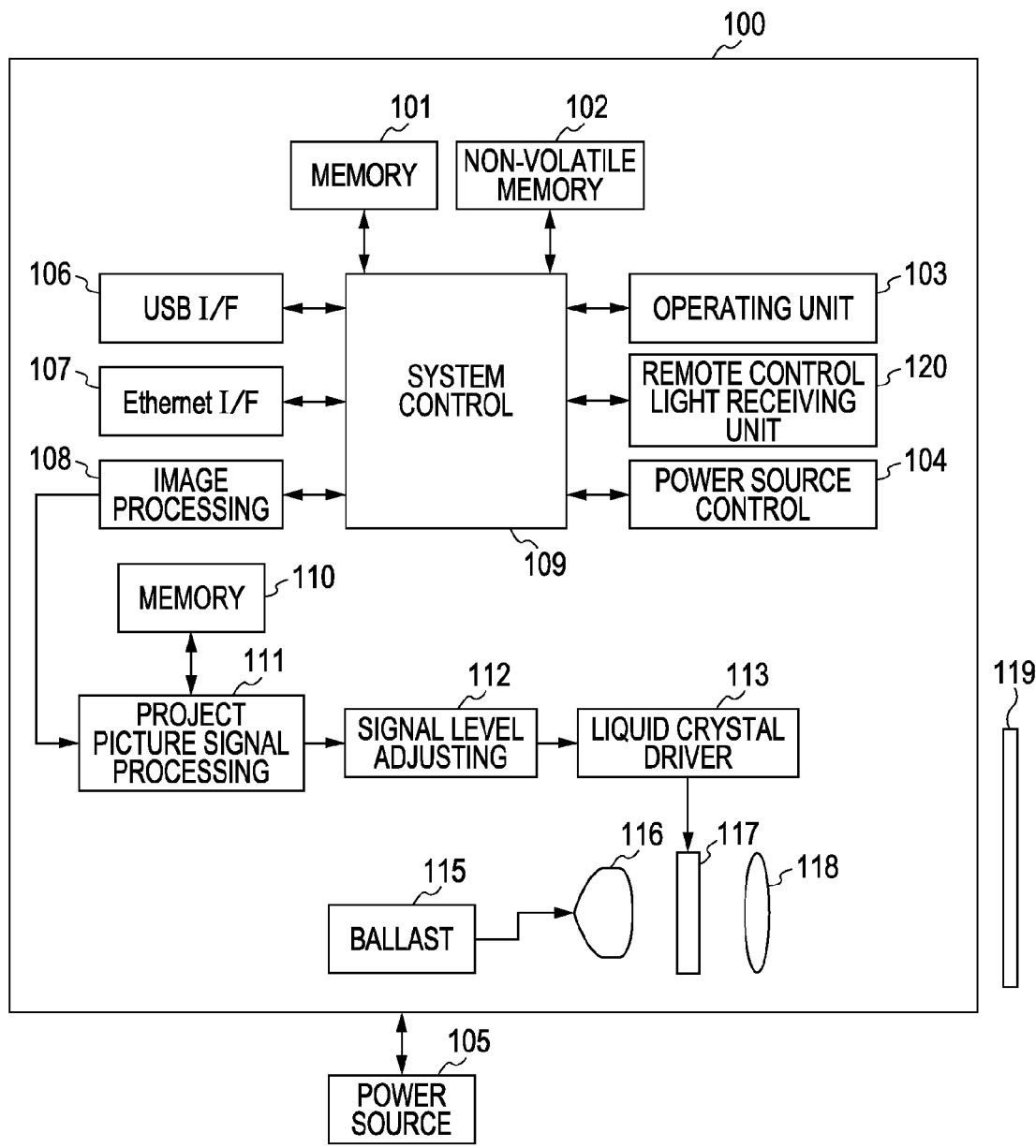
FIG. 1 is a diagram illustrating a configuration of a liquid crystal projector according to an embodiment of the present invention.

FIG. 1 is a diagram illustrating a configuration of the liquid crystal projector according to an embodiment of the present invention. The configuration of the liquid crystal projector according to an embodiment of the present invention will be described below.

Reference numeral 100 denotes the liquid crystal projector according to the present embodiment. Reference numeral 109 denotes a system control circuit controlling the entire liquid crystal projector 100, and 101 denotes memory wherein programs, constants, variables, images and so forth for operating the system control circuit 109 are stored temporarily. Reference numeral 102 denotes a non-volatile memory wherein a firmware program or the like for operating the system control circuit 109 is recorded, and with the control of the system control circuit, recording data in the memory or deleting data can be performed. Information relating to capabilities that the liquid crystal projector 100 has (Capability information) can be recorded in the memory 101.

Reference numeral 103 denotes an operating unit to input various types of operational instructions of the system control circuit 109. The operating unit 103 can be made up of individual or multiple combinations of a keyboard, switch, dial, touch panel, visual input unit, audio recognition apparatus, and so forth. Reference numeral 120 denotes a remote control light receiving unit to receive instructions from the remote controller for inputting various types of operational instructions of the system control circuit 109, and may be made up of an infrared light-receiving unit with the present embodiment.

Reference numeral 104 denotes a power source control unit, and is made up of a DC-DC converter and a switch circuit to switch the blocks to provide electricity. The DC-DC converter and switches are controlled based on instructions from the system control circuit 109, and using the power obtained from a power source 105, necessary voltage is supplied to various parts including a lamp and fan for a necessary period of time. Reference numeral 105 denotes a power source unit made up of an AC adapter or the like.

Reference numeral 106 denotes a USB interface (hereinafter, referred to as "USB I/F") connecting to a digital camera, USB memory, or the like. Reference numeral 107 denotes an Ethernet interface for connecting to a network. Status of a liquid crystal projector failure or the like can be notified to a system centrally managing the liquid crystal projector via this interface.

Reference numeral 108 denotes image processing whereby a JPEG image read from the digital camera, the USB memory, or the like, is digitally converted to an RGB signal made up of 3 types of color signals of red (R)/green (G)/blue (B).

Reference numeral 111 denotes a projector picture signal processing circuit, wherein signal processing is performed to convert a digitized RGB signal into a signal suitable for the projector apparatus. Examples of such signal processing may be, for example, interlace/progressive converting processing, frame rate converting processing, resolution conversion processing, and so forth. Reference numeral 110 denotes frame memory, which is used with signal processing in the event of converting a signal suitable for the projector with the projector picture signal processing circuit 111, and can record an RGB signal of one or more frames. Reference numeral 112 denotes a signal level adjusting circuit, which makes adjustments such that the output from the projector picture signal processing circuit 111 becomes a signal level suitable to a projection image projected by the projector apparatus. Reference numeral 113 denotes a liquid crystal driver, which drives a liquid crystal panel 117 based on an output signal of the signal level adjusting circuit 112.

Reference numeral 116 denotes a lamp, which is a light source to reflect the projection image onto a screen 119. The power source 105 supplies power to the lamp 116. Reference numeral 115 denotes a lamp driving circuit (ballast), which causes a stabilized high voltage for supplying the power supplied from the power source 105 to the lamp 116. An R/G/B color filter is adhered to the liquid crystal panel 117, and performs transmitting/blocking of light corresponding to the RGB image as to the light projected from the lamp 116. A lens group 118 forms an image of the various color of RGB transmitting the liquid crystal panel 117 onto the screen 119, while changing the size of the projected image. The screen 119 provides a projected screen to image the picture signal.

Description will be given below based on the configuration of the liquid crystal projector, according to the present embodiment, the liquid crystal projector and digital camera are connected, and the liquid crystal projector projects the image held by the digital camera based on operations of the digital camera.

Also, in the case of displaying multiple copies of an image, using the direct printing function between the digital camera and display apparatus, similar to printing with the printer, as soon as display of a certain image finishes, the display can be automatically moved to the next image. However, considering a case wherein the display images switch quickly, and an observer wishes to observe more slowly, an arrangement is made wherein the display images can be sequentially switched by performing page sending operations from the remote controller of the image display apparatus.

Note that control of the liquid crystal projector based on the description hereafter is executed by a firmware program existing in the non-volatile memory 102 in FIG. 1.

Figure 2:
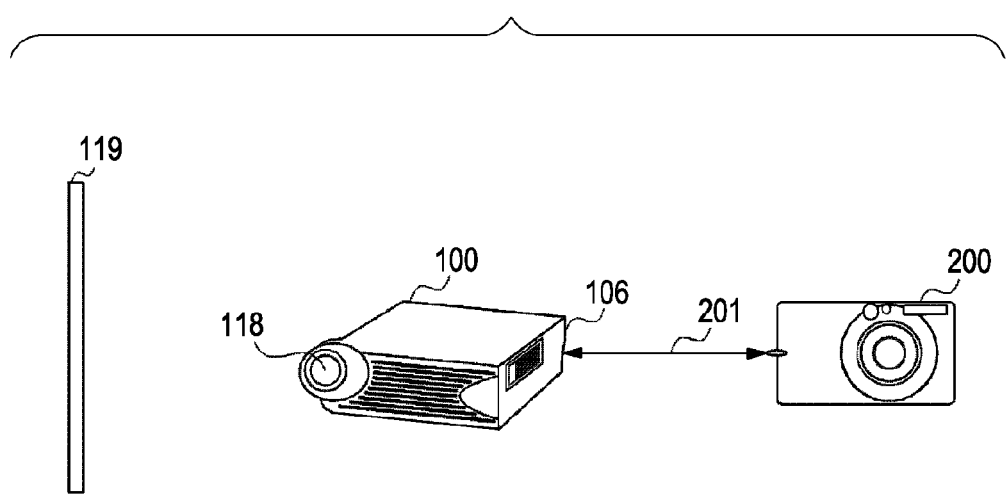
FIG. 2 is a diagram illustrating a configuration of a digital camera and the liquid crystal projector according to an embodiment.

FIG. 2 is a diagram showing a configuration of the digital camera and liquid crystal projector according to an embodiment of the present invention. The liquid crystal projector 100 connects the digital camera 200 via the USB cable 201 inserted in the USB I/F 106. Although not shown in the diagram, the digital camera 200 has a recording media holding photographed images and a USB interface, and has a function to select and print the held photography images upon being connected to the printer.

Note that the communication medium of the system structured with the present embodiment may be a cable/wireless LAN or Bluetooth or the like, and the present embodiment does not rely on the format of the system structure.

Figure 10:
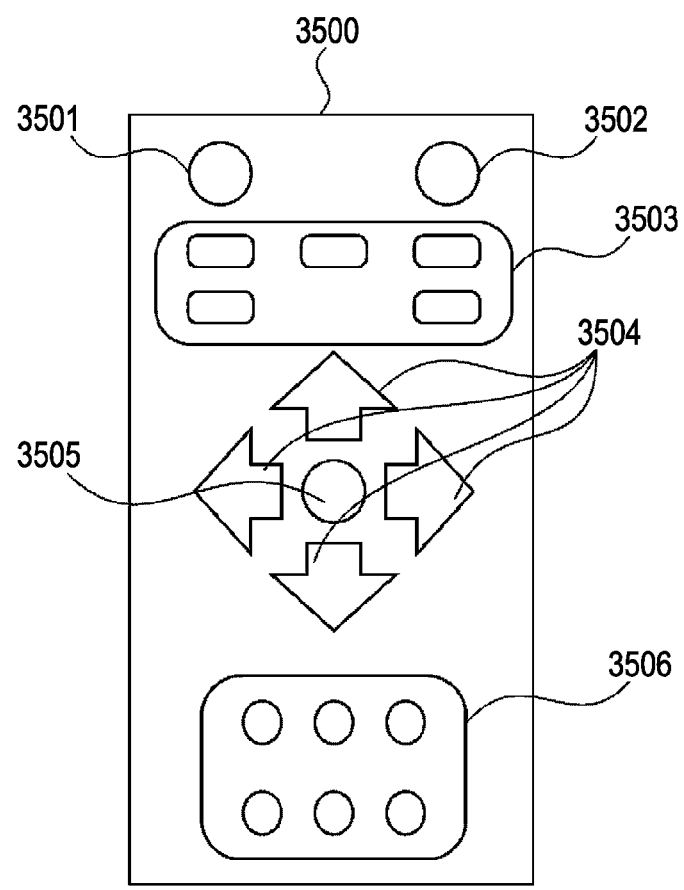
FIG. 10 is an example of a remote controller of the liquid crystal projector according to an embodiment.

FIG. 10 shows an example of the remote controller of the liquid crystal projector 100 according to an embodiment of the present invention. The remote controller has a remote control signal issuing unit 3500, POWER button 3501, AUTO SET button 3502, input signal setting/image setting button 3503, direction buttons 3504, determining button 3505, and page sending/value setting button 3506.

The remote control signal issuing unit 3500 transmits a signal from the remote controller to the main unit. The POWER button 3501 turns the power source on/off. The AUTO SET button 3502 is a button for the liquid crystal projector to automatically perform adjusting of focus, keystone correction, and screen color correcting. The input signal setting/image setting button 3503 is a group of buttons to select the input image, adjust focus, and perform image quality settings and so forth. The direction buttons 3504 specify the directions of up/down/left/right to move a cursor or the like on a menu screen or the like. The determining button 3505 confirms the item selected with the menu screen and so forth. The page sending/value setting button 3506 is a group of buttons for performing page sending of the image, zooming, volume adjustments, and so forth.

Note that with the remote controller, the instructions as to the projector 100 can use either a cable communication unit or a wireless unit. Also, this may be an operating unit on the projector main unit.

Figure 14:
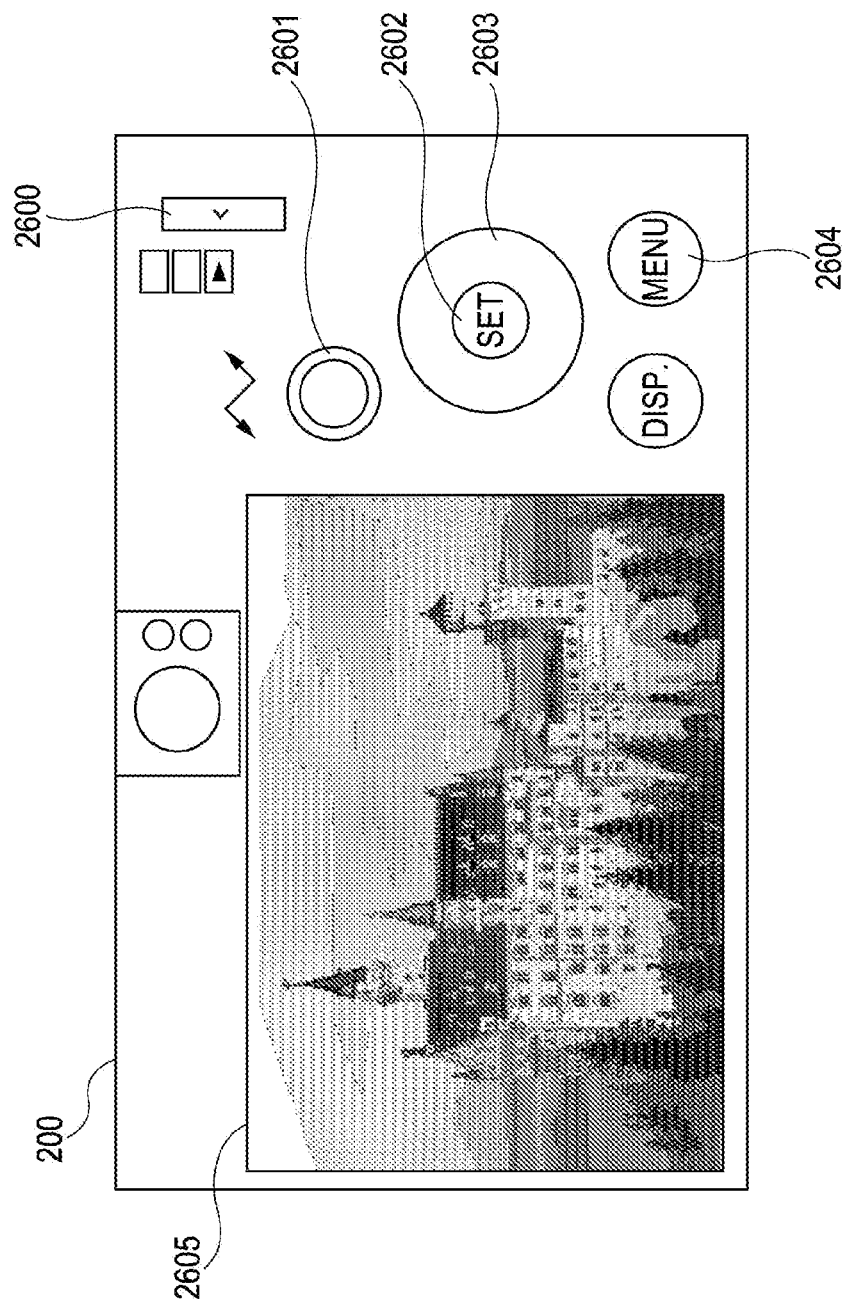
FIG. 14 is a diagram illustrating the back face of the digital camera according to an embodiment.

FIG. 14 is a diagram showing the back face of the digital camera 200 according to an embodiment of the present invention. The back face has a switching switch 2600, direct print button 2601, SET button 2602, up/down/left/right button 2603, MENU button 2604, and liquid crystal monitor 2605.

The switching switch 2600 is a switch to switch the modes of performing photography or displaying the photographed image.

The direct print button 2601 is a button used in the case of printing one copy of the image displayed on the liquid crystal monitor 2605 with direct printing. Direct printing is a function to print the image displayed on the liquid crystal monitor 2605, and there are two types of printing methods, which are pressing the direct print button 2601 or operating from the print menu screen shown in FIG. 15. The printing method by pressing the direct print button 2601 can print one copy of the displayed image with a connected printer. On the other hand, with the printing method with operations from the print menu screen, a user can make printing reservations as to multiple images. Also, with the digital camera according to the present embodiment, number of copies information showing how many copies to print for each image can be set.

Upon connecting to the liquid crystal projector, a lamp on a button illuminates. Upon the direct button 2601 being pressed, the direct print processing screen shown in FIG. 16 is displayed.

Figure 15:
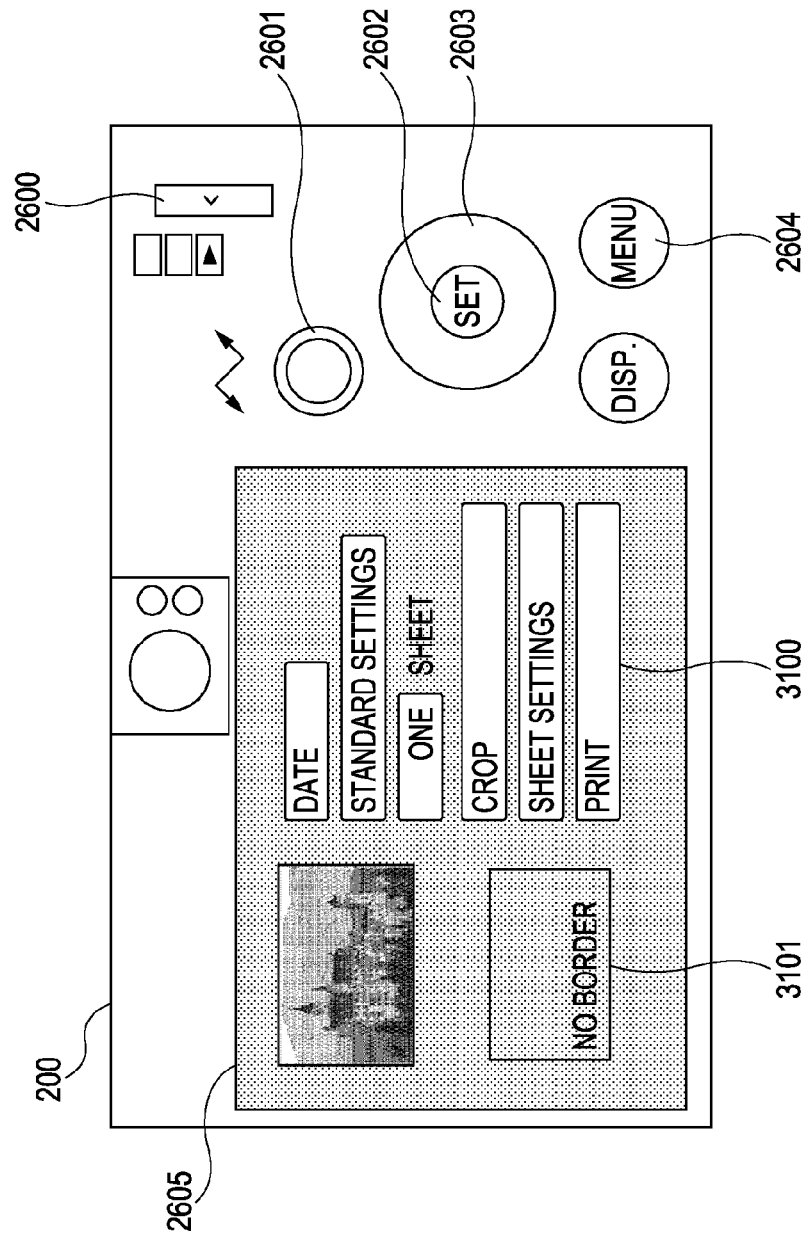
FIG. 15 is an example of a menu screen for instructing printing conditions at the digital camera, in a case of performing direct printing.

The SET button 2602 is a button used when confirming the set printing conditions. Upon pressing the SET button 2602 in a state of displaying an image as shown in FIG. 14, the print menu screen shown in FIG. 15 is displayed. The up/down/left/right button 2603 is used in the case of moving the cursor up/down/left/right in the case of making a menu selection, or in the case of displaying the next image or the previous image in the case that multiple images exist in the image display.

FIG. 15 is an example of a menu screen for instructing printing conditions at the digital camera 200, in a case of performing direct printing. With direct specifying printing, an image can be printed with the conditions specified with the print menu screen in FIG. 15. A direct print setting information display 3101 displays information of the set paper size, paper type, and layout. Upon selecting print 3100 and pressing the SET button 2602, the printing screen shown in FIG. 17 is displayed.

Figure 16:
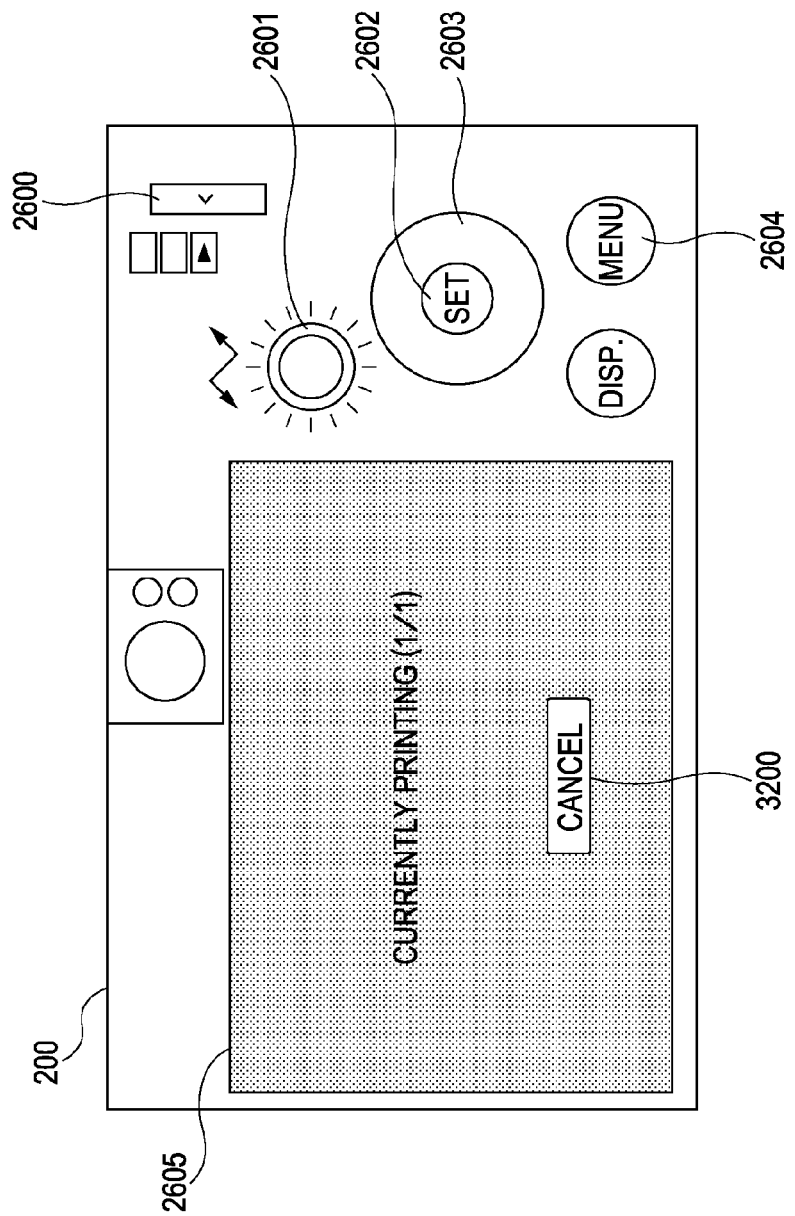
FIG. 16 is an example of a direct print processing screen with a digital camera according to an embodiment.

FIG. 16 is an example of a direct print processing screen when the direct print button 2601 is pressed on the digital camera 200 according to an embodiment of the present invention. Upon the direct print button 2601 being pressed in FIG. 14, printing processing is performed, and a display is made to that effect. Upon selecting cancel 3200 and pressing the SET button 2602, the confirmation screen for canceling the printing shown in FIG. 18 is displayed.

Figure 17:
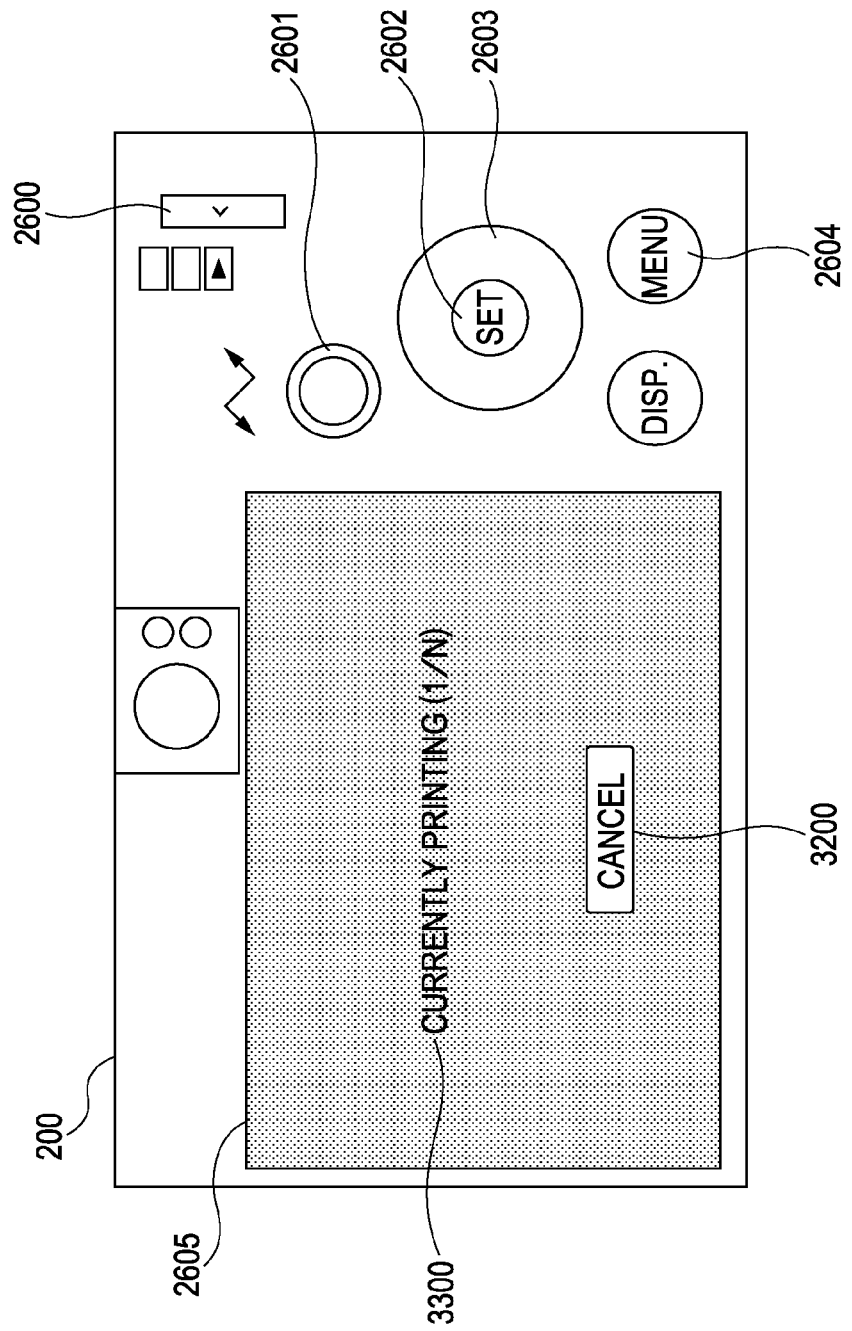
FIG. 17 is an example of a print processing screen with a digital camera according to an embodiment.

FIG. 17 shows an example of the print processing screen with the digital camera 200 according to an embodiment of the present invention. A print processing comment 3300 displays information to the effect that the print processing is being performed, and displays progress of the print processing. N indicates the number of print copies set. Upon selecting the cancel button 3200 and pressing the SET button 2602, the confirmation screen for canceling the printing shown in FIG. 18 is displayed.

Figure 18:
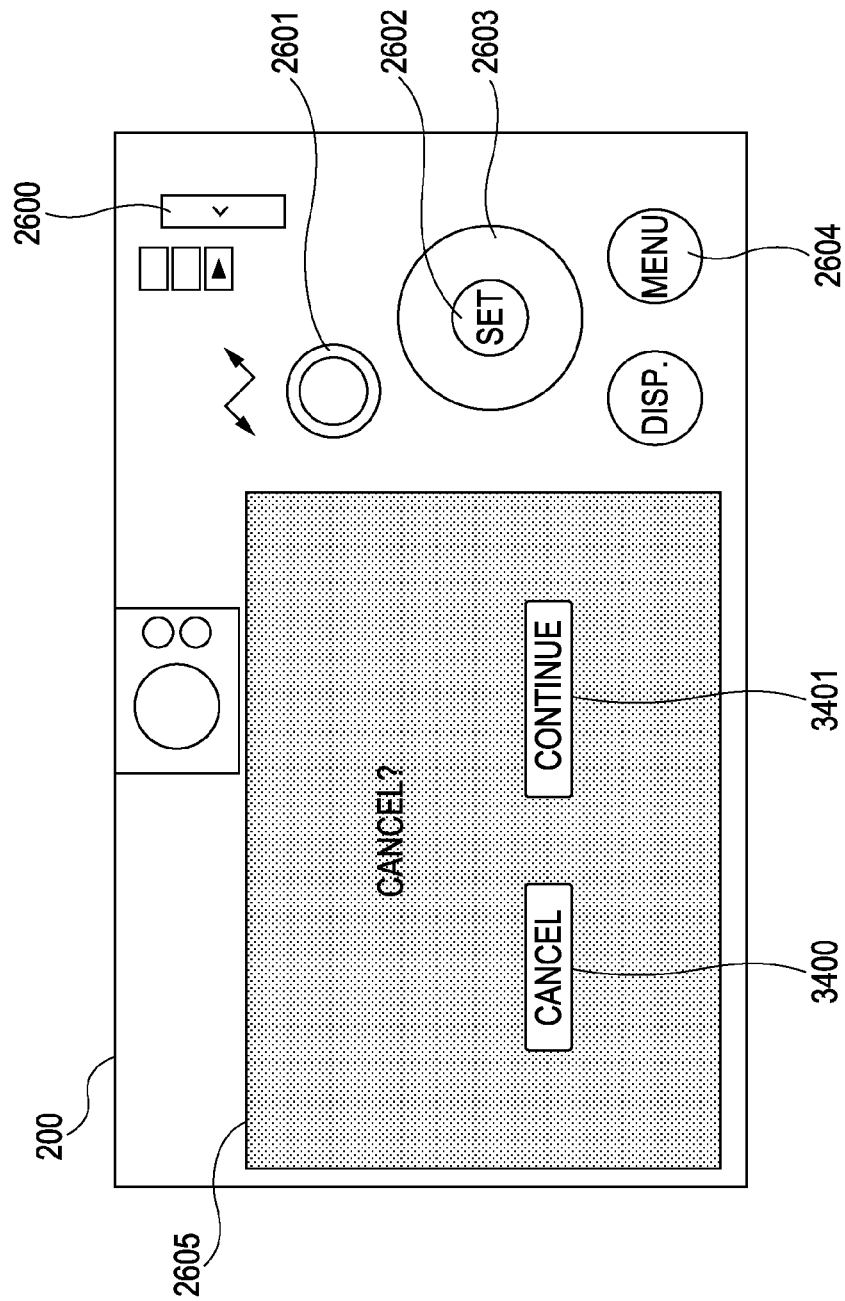
FIG. 18 is an example of a confirmation screen for canceling the print processing with a digital camera according to an embodiment.

FIG. 18 shows an example of the confirmation screen for canceling the printing that is displayed when the cancel button 3200 on the screen in FIGS. 15 and 16 is selected and the SET button 2602 is pressed. Upon the cancel button 3400 being selected and the SET button 2602 pressed, the print processing is cancelled and the screen is returned to the screen shown in FIG. 16. Upon the continue button 3401 selected and SET button 2602 pressed, the print processing is continued.

Figure 3:
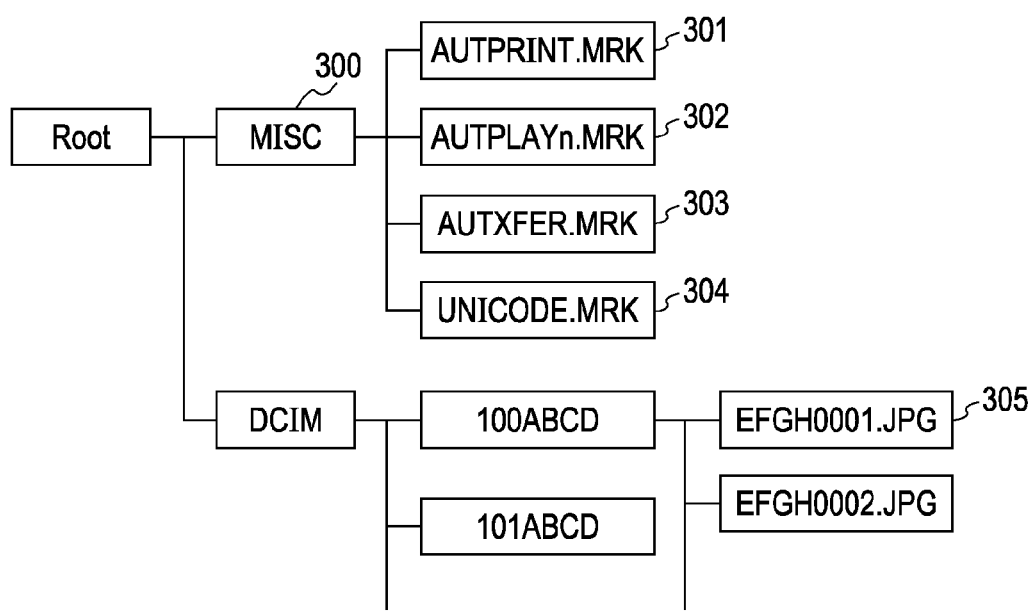
FIG. 3 is a diagram illustrating a folder configuration of recording media of the digital camera according to an embodiment.

FIG. 3 is a diagram showing a folder configuration of recorded media of the digital camera according to an embodiment of the present invention. A DPOF file shows four types of text file groups, which are the control files of an automatic print file 301, automatic play file 302, and automatic transfer file 303, and the UNICODE text string description file 304 wherein user information is stored described in Unicode. The DPOF file is configured under the "MISC" directory 300 which is directly below the route directory. The photograph image 305 is stored under the "DCIM" directory.

FIG. 9 shows a description example 306 of the automatic print file 301. A header portion with the digital camera name, file create date/time and so forth, and product ID, print type specification, number of print copies specification, format, bus information of the image file, image photography date/time and so forth are stored for each print job.

FIG. 7 is a model diagram showing a direct print system which is a premise to the embodiment of the present invention. The direct print system which is a premise to the embodiment of the present invention is a server/client model, and has a Print Server 501/Client 502 and Storage Client 503/Server 504. Communication with this model has a sequence that, basically, the Server responds to a request from the Client, and replies with the results thereof to the Client, and each operation is completed. Also, a sequence wherein the Client responds to a notification issued by the Server, and responds the receipt confirmation to the Server also completes each event.

Specifically, the Print Server 501 of the liquid crystal projector 100 responds in accordance with the printing request from the Print Client 502 of the digital camera 200. Next, the Storage Client 503 of the liquid crystal projector 100 requests image data for projecting an image, and the Storage Server 504 of the digital camera 200 responds with the image data. Also, the Print Client 502 of the digital camera 200 responds with receipt confirmation of an event as to an issued notification regarding an event such as device status from the Print Server 501 of the liquid crystal projector 100.

FIGS. 4A through 6C are diagrams showing various types of commands and events used with the embodiments of the present invention. All commands and events are described in XML format.

DPS_ConfigurePrintService 401 is a command to confirm what service functions each device has in the event that devices are connected, and the version, vendor name, product name, serial number, and so forth thereof are described therein. Reference numeral 401 denotes a command that the Print Client 502 transmits. Reference numeral 402 denotes an example of a response from the Print Server 501 to the DPS_ConfigurePrintService 401, and Result values are described therein.

DPS_GetCapability 403 is an example of a command for the Print Client 502 to inquire as to the capabilities that can be set. Capabilities can be inquired for quality, paper size, paper type, file type, date printing, file name printing, image optimizing, layout, fixedSize, and cropping. With the present embodiment the liquid crystal projector 100 acts toward the digital camera as if the liquid crystal projector 100 is the printer, thereby responding with printing capabilities as the Print Server 501.

Reference numeral 404 denotes a response example to the DPS_GetCapability 403 from the Print Server 501, wherein the Result values and paper size that can be set (standard, L-size, 2L-size, etc) at the liquid crystal projector are described.

Note that the liquid crystal projector itself does not print with a printing paper size, but since the projector is acting as the printer, it responds with information such as paper size. In the case that paper size is described in a job generated by the digital camera using this paper size information, the liquid crystal projector can be designed to change the actions thereof in accordance with the size information thereof.

DPS_StartJob 405 is an example for requesting printing from the digital camera 200. Parameters for the printing request include printing settings and printing information. Content (quality, paper size, paper type, file type, date printing, file name printing, image optimizing, layout, fixedSize, and cropping) that is set by user operations of the digital camera 200 are described in the printing settings. An image file ID as to a printed image of one or more images specified for printing as the image specifying information, and the number of copies to be printed for each image specified in the image specifying information, is described in the printing information. In order to set the same image for printing multiple copies with the DPS_StartJob 405, the number of copies to be printed should be set with the <copies> tag appended to the <printInfo> tag. Also, multiple copy printing of the same image can be sent by describing the <printInfo> tag multiple times in the DPS_StartJob 405. This is a DPS_StartJob 405 example of a command for the Print Client 502 to request printing. Reference numeral 406 denotes a response example from the Print Server 501 to the DPS_StartJob 405, and Result values are described therein.

DPS_AbortJob is a command to cancel the printing from the digital camera 200. Reference numeral 411 denotes an example of the DPS_AbortJob command that the Print Client 502 sends to cancel the printing. Reference numeral 412 denotes a response example from the Print Server 501 to the DPS_AbortJob 411, and Result values are described therein.

DPS_ContinueJob is a command to restart the printing from the digital camera 200. Reference numeral 413 denotes an example of the DPS_ContinueJob 413 that the Print Client 502 sends to restart the printing. Reference numeral 414 denotes a response example from the Print Server 501 to the DPS_ContinueJob 413, and the Result values are described therein.

An event to notify the printing status from the liquid crystal projector 100 is DPS_NotifyJobStatus, and printing progress and total number of copies to be printed, and so forth are described therein. Reference numeral 408 denotes an example of the event DPS_NotifyJobStatus 408 that the Print Server 501 sends to notify the printing status. Reference numeral 407 denotes a response example from the Print Client 502 to the DPS_NotifyJobStatus 408, and the Result values are described therein.

DPS_NotifyDeviceStatus is an event to notify the device status of the liquid crystal projector 100 from the liquid crystal projector 100. Information such as the printing status of idle/printing/paused, error content of an image file, whether there are Capability changes, and whether new print jobs can be accepted or not, is described therein. Reference numeral 410 denotes an example of the event DPS_NotifyDeviceStatus 410 that the Print Server 501 sends to notify the device status. Reference numeral 409 denotes a response example from the Print Client 502 to the DPS_NotifyDeviceStatus 410, and the Result values are described therein.

DPS_GetFileID is a command to obtain a necessary image file ID from the liquid crystal projector 100, and the file bus and so forth of the image is described therein. 421 is an example of the command DPS_GetFileID that the Storage Client 504 sends to obtain the image file ID. Reference numeral 420 denotes a response example from the Storage Server 504 to the command, and the Result values and file ID are described therein.

DPS_GetFileInfo is a command to obtain necessary file information from the liquid crystal projector 100. Reference numeral 423 denotes an example of the command DPS_Get- FileInfo 423 that the Storage Client 503 sends to obtain the image file information, and the file ID of the image for which information is to be obtained is described therein. Reference numeral 422 denotes a response example from the Storage Server 504 to the command, and the Result values and image file type, file size, thumbnail format, thumbnail size, and so forth are described therein.

DPS_GetFile is a command to obtain the necessary image from the liquid crystal projector 100. Reference numeral 424 denotes an example of the command DPS_GetFile 425 for the Storage Client 503 to obtain an image, and the file ID of the image for which information is to be obtained is described therein. Reference numeral 425 denotes a response example from the Storage Server 504 to the command, and the Result values and size of image to be obtained are described therein. Although not shown in the diagram, a command DPS_Get-PartialFile can be used to divide and obtain an image, and DPS_GetPartialFile can be used instead of DPS_GetFile.

Figure 8:
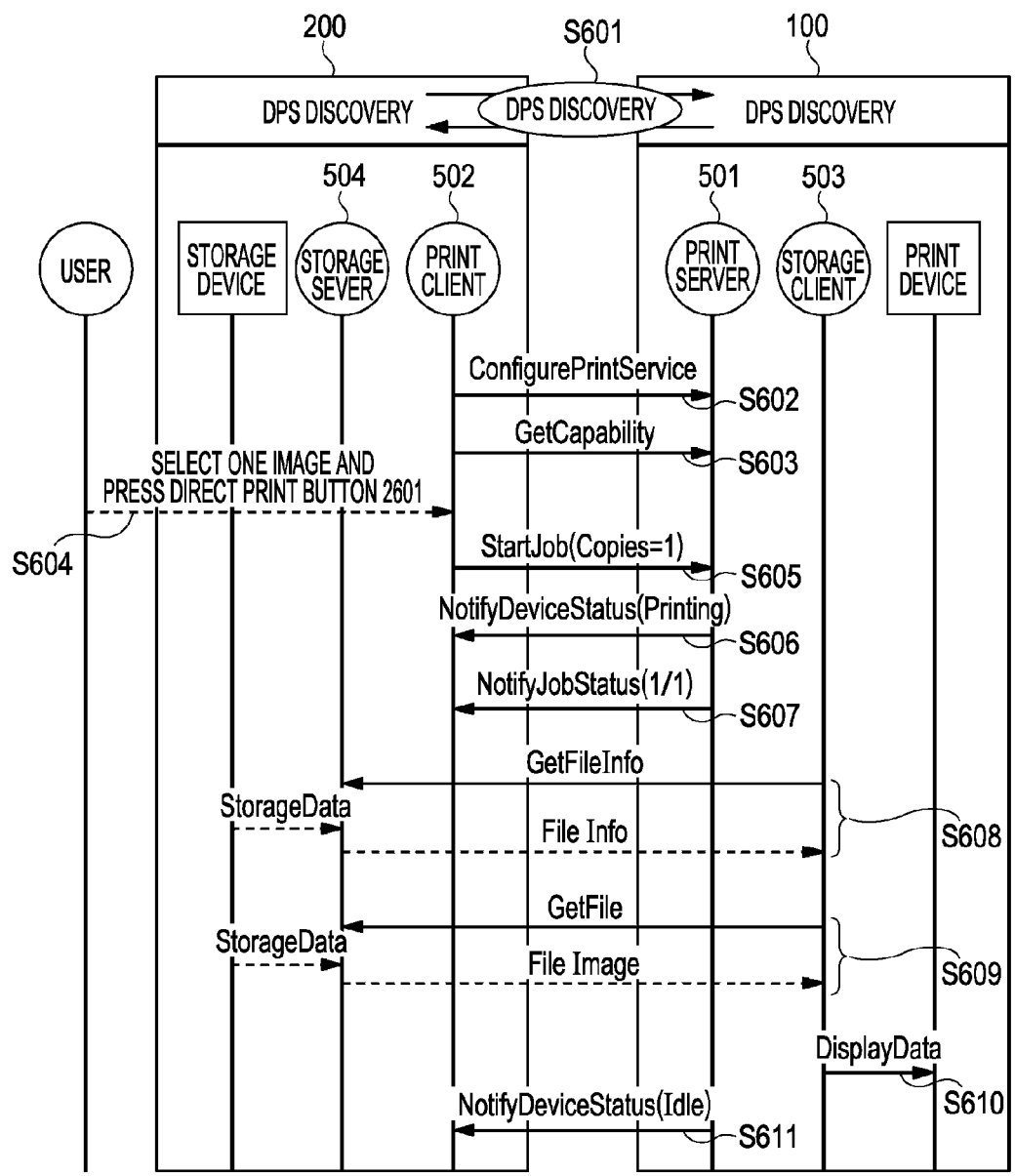
FIG. 8 is a sequence diagram of commands from the start of connections between devices until the image display is completed.
Figure 11:
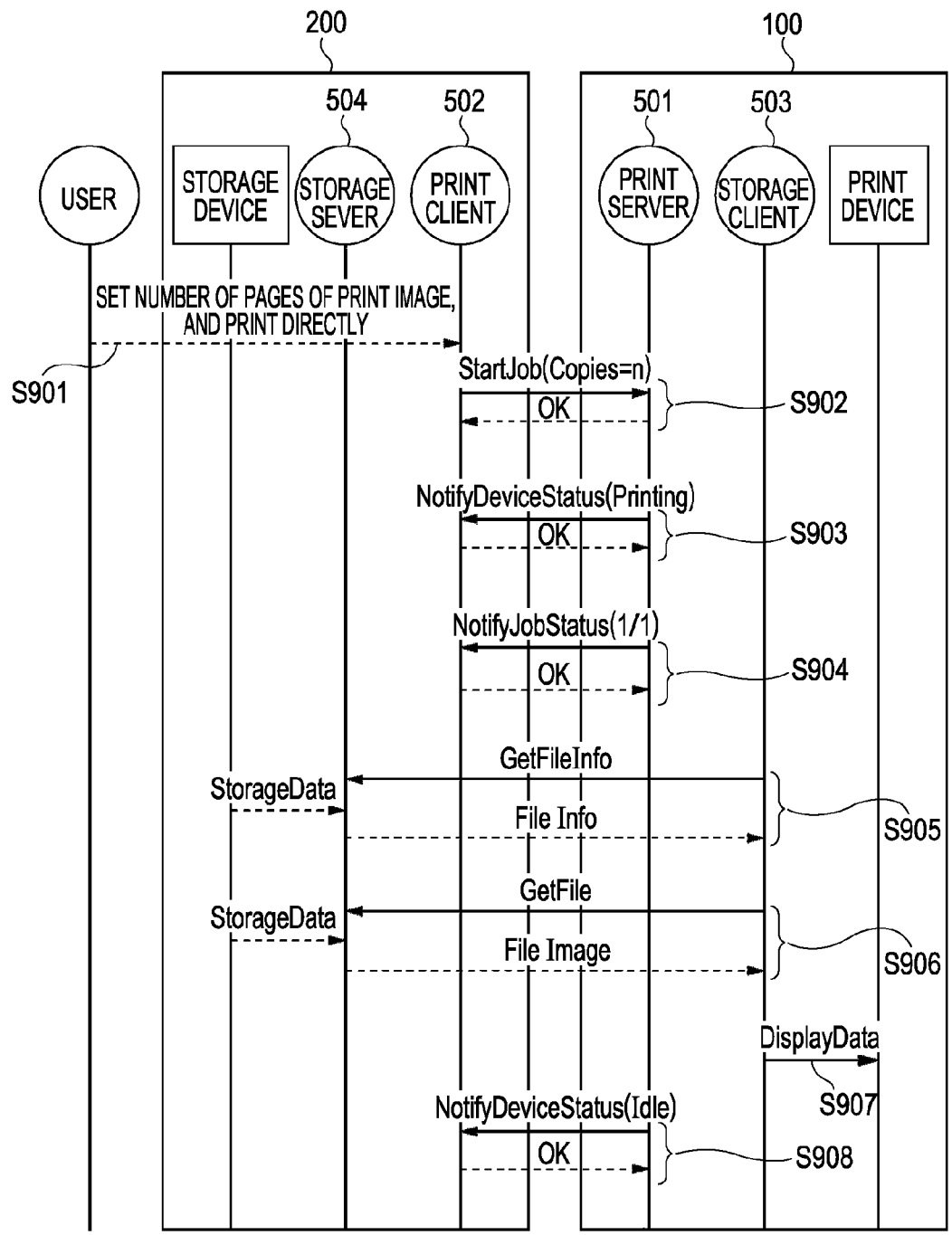
FIG. 11 is a sequence diagram of direct printing according to an embodiment.

FIG. 8 is a sequence example of printing is performed for one copy with direct connection. FIG. 11 is a sequence example of a command when printing is performed for n copies (n≥2). FIGS. 8 and 11 will be described below. FIG. 8 shows a sequence from the liquid crystal projector 100 and digital camera 200 starting a connection based on the direct print standard until the liquid crystal projector 100 displays one copy of an image.

First, negotiation is performed to confirm whether or not between the liquid crystal projector 100 and digital camera 200 there is a direct print function. The connection of a USB cable is used as a trigger and connection is established in accordance with PTP (Picture Transfer Protocol). Subsequently, in step S601, confirmation is made as to whether there is a direct print function called DPS Discovery.

In step S602, the Print Client 502 of the digital camera 200 issues DPS_ConfigurePrintService 401 to the Print Server 501 of the liquid crystal projector 100. The reason for this is to confirm the service functions that both devices of the liquid crystal projector 100 and the digital camera 200 mutually have. That is to say, the liquid crystal projector 100 having a Print Server 501/Storage Client 503 and the digital camera 200 having a Print Client 502/Storage Server 504 is mutually communicated.

In step S603, the print Client 502 issues a DPS_GetCapability 403 to the Print Server 501 to inquire the capability of the liquid crystal projector 100. The Capability information obtained by the Print Client 502 is reflected in the UI of the digital camera 200, and functions that the user can select are determined. The determined functions include quality, paper size, paper type, file type, date printing, file name printing, image optimizing, layout, fixedSize, and cropping.

Step S604 is an operation for the user to select an image to be displayed with the liquid crystal projector 100 from the digital camera 200, and press the direct print button 2601. With the operation in step S604, the Print client 502 issues a DPS_StartJob 405 to the Print Server 501 to print one copy of an image displayed when the direct print button 2601 is pressed. Thus, print settings and printing information is notified from the Print Client 502 to the Print Server 501, and display processing is started.

In step S606, the liquid crystal projector 100 receives the DPS_StartJob 405, and the Print Server 501 issues a DPS_NotifyDeviceStatus 409 to the Print Client 502 in order to notify the status of the print processing (actually, the display processing of the projector) to the digital camera 200.

In step S607, the Print Server 501 issues a DPS_Notify-JobStatus 407 to the Print Client 502 in order to notify the digital camera 200 of progress showing which page of the image file specified for printing is currently being subject to printing processing. However, with the present invention, notification is actually made for progress of the display processing of the projector, not progress of the printing processing.

In step S608, the Storage Client 503 issues a DPS_GetFileInfo 422 to the Storage Server 504 in order to obtain the file type and file size information of the image to be displayed next. Based on the file size information sent to the Storage Client 503, the storage Client 503 secures memory, and prepares to obtain the image file to follow subsequently.

In step S609, the Storage Client 503 issues a DPS_GetFile 424 to the Storage Server 504 in order to obtain the image data all at once. A method to divide and obtain with a DPS_GetPartialFile instead of the DPS_GetFile 424 can also be used here. In step S610, the data obtained by the Storage Client 503 in step S609 is transmitted to the Print Device.

Upon the above completing, as step S611, the print server 501 issues a DPS_NotifyDeviceStatus 409 to the Print Client 502 in order to notify the digital camera 200 that the liquid crystal projector 100 has transferred to a standby state.

FIG. 11 shows a sequence from the state that a connection based on direct print standard is established between the liquid crystal projector 100 and digital camera 200 until the display image is selected with the digital camera 200 and actual display of the image is completed.

Step S901 is an operation wherein the user sets the image to be displayed with the liquid crystal projector 100 from the UI of the digital camera 200 and the number of copies to display, and executes the direct printing function.

In step S902, the Print Client 502 issues a DPS_StartJob 405 to the Print Server 501. From step S902, print settings and printing information is notified from the Print Client 502 to the Print Server 501 and display processing is started. At this time, with the present invention even if the <copies> tag of the DPS_StartJob 405 specifies the number of copies of images to print as two or more copies, the Print Server 501 converts the number of copies information to one copy and interprets the job as a display request to display one copy. Alternatively, even if the number of copies information is not converted to one copy, the number of copies information can be simply ignored and the job may be interpreted as a display request to display one copy.

In step S903, the Print Server 501 sets and issues values showing that printing is occurring to the parameters of the DPS_NotifyDeviceStatus 409 in order to notify the Print Client 502 that the state thereof has transferred from a standby state to a display processing state.

In step S904, the Print Server 501 issues a DPS_NotifyJobStatus 407 in order to perform progress notification to the Print Client 502 showing which copy, of the total number of image copies n which are specified for printing, is currently being subject to display processing.

The total number of image copies n is interpreted here as the number of different images specified with the DPS_StartJob 405. That is to say, for example in the case that printing is specified in the DPS_StartJob 405 for 3 copies each of 4 types of images, the total number of image copies is not 12, but the 4 of the 4 types is employed. As notification of progress, in the event that the first type of image is displayed, 1/4 is notified, and in the event that the third type of image is displayed, 3/4 is notified.

Note that as a modified example of the notification, the total number of images n can be arranged wherein a total number of sheets to print is 12, in the event of receiving the first type of image is 1/12, the second type is 4/12, the third type is 7/12, and so forth, such that discrete progress notification is performed.

In step S905, the Storage Client 503 issues a DPS_GetFileInfo 422 to the Storage Server 504 in order to obtain the file type and file size information of the image to be displayed next. Based on the file size information sent to the Storage Client 503, the storage Client 503 secures memory, and prepares to obtain the image file to follow subsequently.

In step S906, the Storage Client 503 issues a DPS_GetFile 424 to the Storage Server 504, based on the information obtained in step S905, and obtains the image data all at once. Note that the image data can be obtained in divisions with a DPS_GetPartialFile instead of the DPS_GetFile 424 can also be used.

In step S907, the image data obtained by the Storage Client 503 is transmitted to the Print Device.

Upon the above being completed, as step S908, the Print Server 501 issues a DPS_NotifyDeviceStatus 409 to the Storage Client 503 in order to notify that the Print Server 501 has transferred to a standby state.

Figure 19:
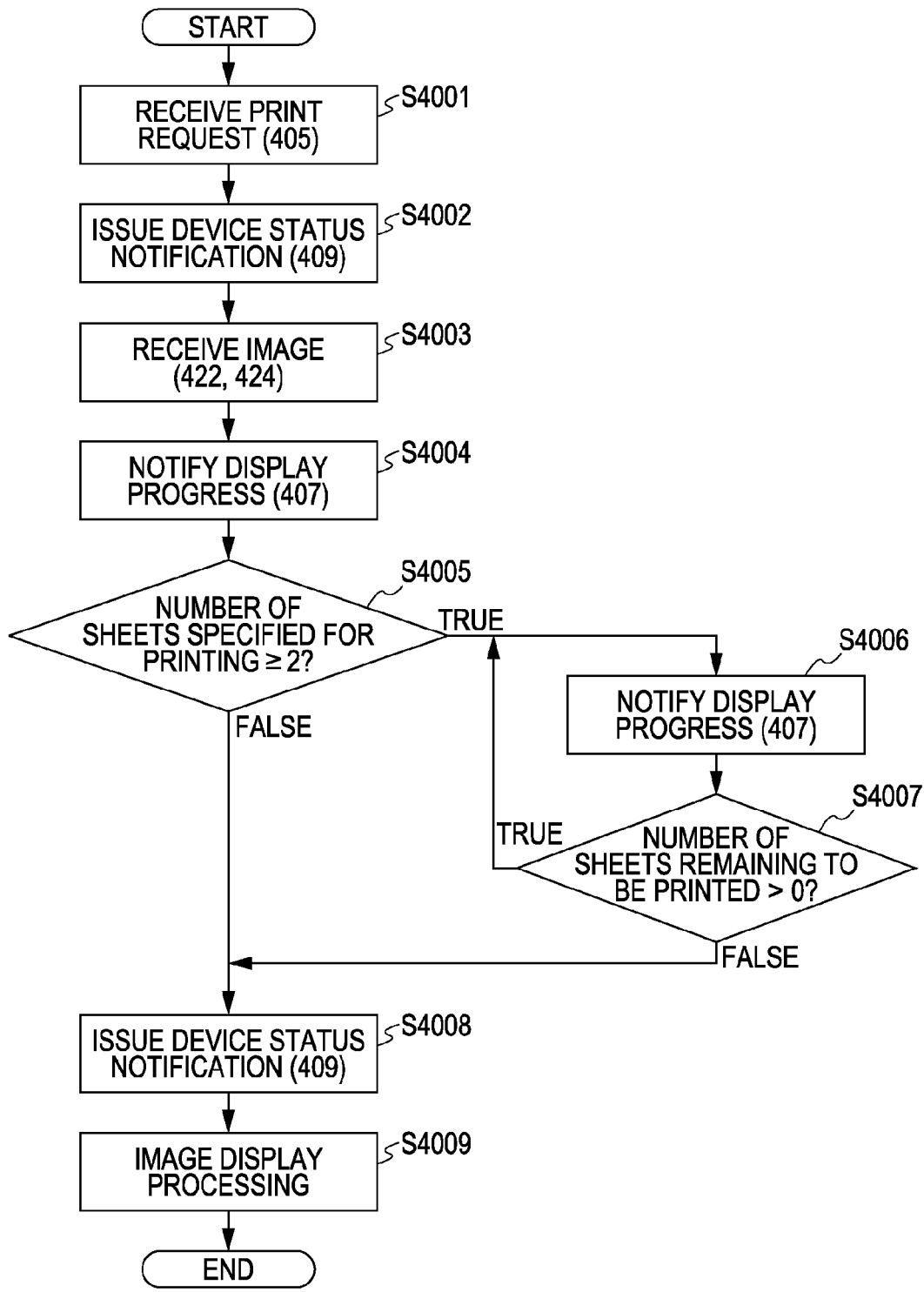
FIG. 19 is a flowchart for the liquid crystal projector according to an embodiment when the number of copies parameter within the print job is greater than 1.

FIG. 19 is a diagram summarizing the image display processing in FIGS. 8 and 11. In step S4001, the liquid crystal projector 100 receives the DPS_StartJob 405 from the digital camera 200. In step S4002, the liquid crystal projector 100 issues a DPS_NotifyDeviceStatus 409 to the digital camera 200, and is transferred to a printing state. In step S4003, a DPS_GetFileInfo 422 and DPS_GetFile 424 are issued, and the liquid crystal projector 100 receives an image from the digital camera 200. In step S4004, the liquid crystal projector 100 issues a DPS_NotifyJobStatus 407 to the digital camera 200, and transmits to the digital camera 200 information to the effect that the first image has been received. In step S4005, the liquid crystal projector 100 determines whether or not the value of the <copies> tag in the DPS_StartJob 405 received in step S4001 is 2 or greater. If <copies> is 1 (FALSE in step S4005), the processing is moved to step S4008, and the liquid crystal projector 100 issues a DPS_NotifyDeviceStatus 409 to the digital camera 200 and notifies that the liquid crystal projector 100 itself has transferred to a standby state. Next, display processing of the image received in step S4009 is performed. If <copies> is 2 or greater (TRUE in step S4005), the processing is moved to step S4006, and the liquid crystal projector 100 issues a DPS_NotifyJobStatus 407 to the digital camera 200, and progress thereof is notified. In step S4007, if the number of sheets remaining to be printed is 1 or more (TRUE in step S4007), the processing is returned again to step S4006. If the number of sheets remaining to be printed is 0 (FALSE in step S4007), the processing is moved to step S4008.

The receive print request in step S4001, issue device status notification in step S4002, issue device status notification in step S4008, and receive image in step S4003 in FIG. 19 are realized with control of the system control unit 109 via a USB I/F 106 serving as a communication unit. Also, up to the notify display progress in steps S4004 and S4006 is notified via a USB I/F 106, with the control of the system control unit 109 serving as the image display control unit. The image display processing in step S4009 is realized with a projection function (113, 116, 117, etc) of a projector serving as a display unit.

Thus, with the present embodiment, even if a multiple-copy printing request for the same image is sent from the digital camera 200 to the liquid crystal projector 100, display processing will not be repeated for the same image. In other words, the liquid crystal projector does not repeat the transmission request for the same image to the digital camera, which may reduce the quantity of data to be transmitted, and reduces the time taken for transmission processing, whereby the waiting time of the user may be reduced. Further, in the case of the user performing an image switching operation, sending pages between the same images with key operation is not necessary, whereby wasteful operations can be reduced.

Note that with the above-described embodiment, an operation to manually switch images is instructed, but the present invention is advantageous even if performing image switching processing automatically. For example, the present invention is also favorable in the case of setting images to switch every predetermined amount of time.

For example, let us assume a case wherein display processing is performed using a job wherein printing is set for 5 copies of a certain image, and further, a case wherein the display time is set as 10 seconds for 1 image. In this case, it is expected that the following image may be displayed after 10 seconds, but in this case 50 seconds must pass before the following image is displayed. The present embodiment can also do away with such inconveniences.

In second embodiment, the configuration of the liquid crystal projector 100 in the prior embodiment and the configuration of the digital camera 200 and liquid crystal projector 100 are similar, but this embodiment will be described in which the printing start operation and thereafter have been modified.

The method to specify the number of copies in a command sent from the digital camera may be accomplished through various methods, depending on implementation thereof. In the present embodiment, description will be given for a case wherein multiple numbers of copies are requested for printing by describing the information specifying the same image multiple times in the <printInfo> tag in the StartJob 405, multiple numbers of copies are not requested for printing with the <copies> tag in the StartJob 405.

Figure 20:
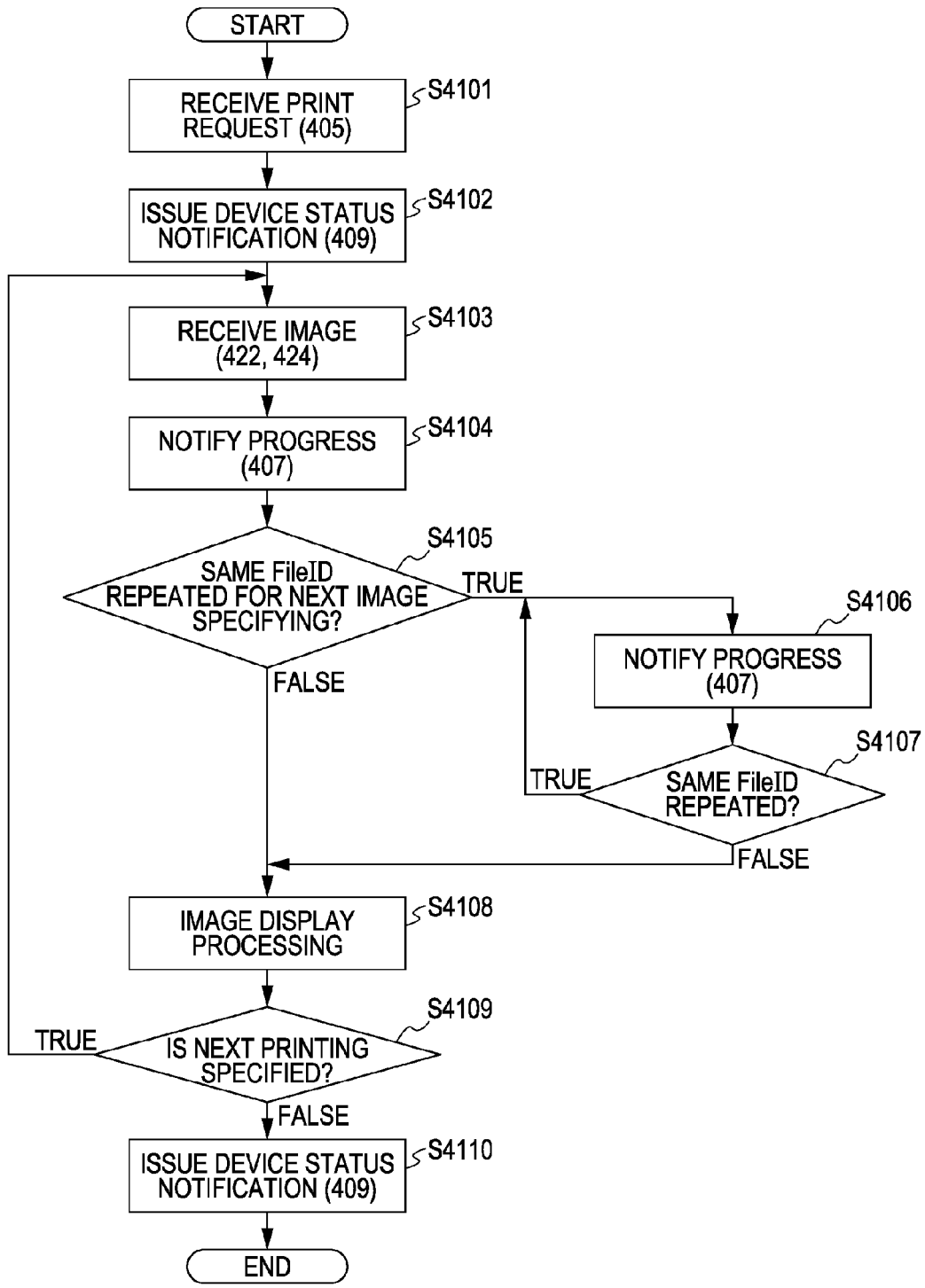
FIG. 20 is a flowchart for the liquid crystal projector according to an embodiment when the same image is described multiple times within the print job.

FIG. 20 is a flowchart describing from the state wherein the liquid crystal projector 100 and digital camera 200 have established a PictBridge until the display images are selected with the digital camera and the display is actually completed with the direct printing function.

In step S4101, the liquid crystal projector 100 receives the DPS_StartJob 405 from the digital camera 200. In step S4102, the liquid crystal projector 100 issues a DPS_NotifyDeviceStatus 409 to the digital camera 200, and is transferred to a printing state. In step S4103, a DPS_GetFileInfo 422 and DPS_GetFile 424 are issued, and the liquid crystal projector 100 receives an image from the digital camera 200. In step S4104, the liquid crystal projector 100 issues a DPS_NotifyJobStatus 407 to the digital camera 200, and transmits to the digital camera 200 information to the effect that the image first specified with the job has been received. In step S4105, the liquid crystal projector 100 references the parameters of the StartJob 405, and determines whether or not the FileID of the image specified for printing following the image received in step S4103 is the same as the fileID of the image received in step S4103. In the case that there is no next printing specification, or the FileID of a different image is specified (FALSE in step S4105), the processing is transferred to step S4108. If printing specifying as to the same image (TRUE in step S4105), the processing is transferred to step S4106, and the liquid crystal projector 100 issues a DPS_NotifyJobStatus 407 to the digital camera 200, and progress is notified thereto. This notification shows information to the effect that printing is in process (actually shows that the projector is displaying an image), and also notifies that reception of the image to be printed following the image notified in step S4104 is ended. Thus the digital camera 200 determines that transmission of the images to be printed following the image transmitted in step S4103 is ended, and recognizes that the progress has advanced one image. In step S4107, determination is made as to whether the image specified for printing further thereafter also has the same FileID, and if the FileID is the same (TRUE in step S4107), the processing is returned again to step S4106, and progress is further advanced. If there is no more printing specifying as to the same image (FALSE in step S4107), the processing is transferred to step S4108.

In step S4108, display processing of the received image is performed and the processing is transferred to step S4109. In step S4109, the parameters of the StartJob 405 are referenced, and confirmation is made as to whether there is any specified information of images to be printed next. In the case there is specified information (TRUE in step S4109), the processing is returned to step S4103, and reception processing of such image is performed, and if not (FALSE in step S4109), the processing is transferred to step S4110.

In step S4110, the liquid crystal projector 100 issues a DPS_NotifyDeviceStatus 409 to the digital camera 200, the DPS_StartJob 405 sent from the digital camera is ended, notification is made that the liquid crystal projector 100 itself has transferred to a standby state, and the processing is ended.

In third embodiment, the scenario corresponding to a digital camera requesting multiple copy printing with a method different from the second embodiments is provided. Specifically, the embodiment is an embodiment corresponding to a camera to divide one job for specifying printing of one copy of one image and performing printing requests, after performing multiple copies print setting for the same image from the digital camera.

Also, the present embodiment can be used when, at a time that a certain image is displayed, the above-described direct print button 2601 is continuously pressed, and in this case also, one job is continuously issued in order to specify printing of one copy of one image.

Figure 21:
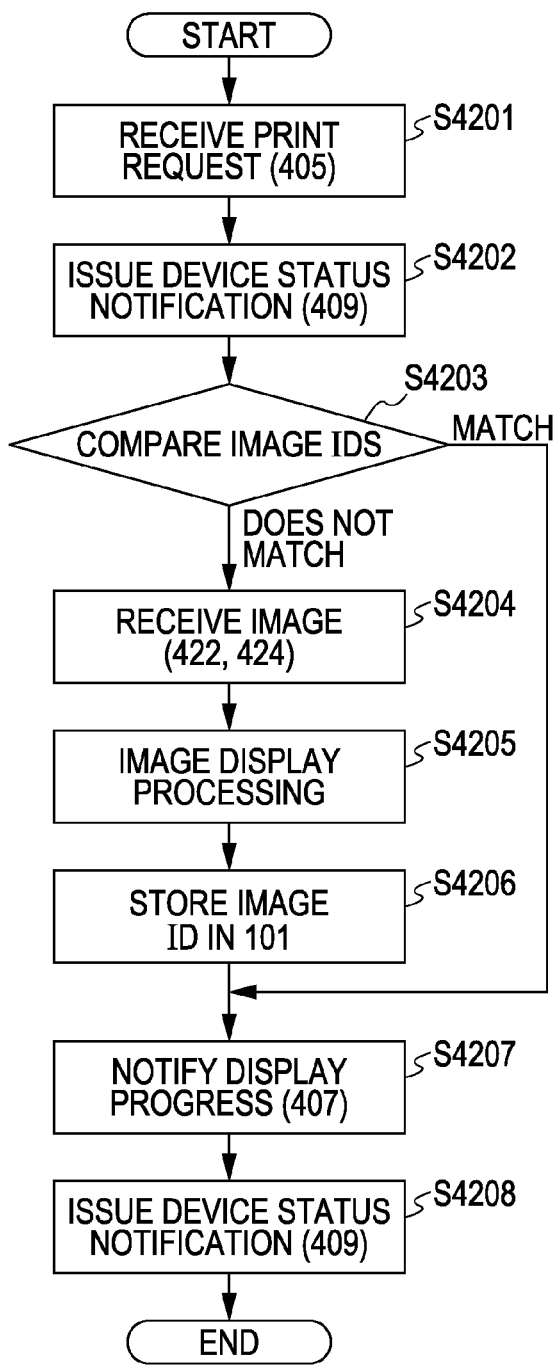
FIG. 21 is a flowchart for the liquid crystal projector according to an embodiment when the same image continuously receives printing requests across multiple continuous print jobs.

FIG. 21 is a flowchart describing from the state wherein the liquid crystal projector 100 and digital camera 200 have established a connection until the display images are selected with the digital camera and the display is actually completed with the direct printing function.

In step S4201, the liquid crystal projector 100 receives the DPS_StartJob 405 from the digital camera 200. In step S4202, the liquid crystal projector 100 issues a DPS_NotifyDeviceStatus 409 to the digital camera 200, and notifies information of having transferred to the printing state.

The FileID of the image file executing display processing with the previous job is stored in the memory 101 of the liquid crystal projector 100.

In step S4203, the FileID of the image file stored in the memory 101 is compared to the FileID described in the DPS_StartJob 405 received in step S4201. If the FileIDs do not match, or if the FileID is not stored in the memory 101 (DOES NOT MATCH in step S4203), the processing is transferred to 4204. If the FileIDs match (MATCH in step S4203), the processing is transferred to step S4207.

In step S4204, a DPS_GetFileInfo 422 and DPS_GetFile 424 are issued, and the liquid crystal projector 100 receives an image from the digital camera 200. In step S4205, the liquid crystal projector 100 performs display processing of the received image file, and then, in step S4206, stores the FileID corresponding to the displayed image in the memory 101.

In step S4207, the liquid crystal projector 100 issues a DPS_NotifyJobStatus 407 to the digital camera 200, and notifies that a job according to the DPS_StartJob 405 has been completed. In step S4208, the liquid crystal projector 100 issues a DPS_NotifyDeviceStatus 409 to the digital camera 200, and notifies to the effect that the liquid crystal projector 100 is in standby state for the next job.

By performing the above-described processing, even in the case that the same image is continuously requested for printing across multiple continuous print jobs, the liquid crystal projector 100 can omit these without obtaining the same image in the digital camera several times. Also, the user does not have to send the pages between images with key operations.

In fourth embodiment an example corresponding to multiple number of copies printing requests with the DPOF printing is provided. The present embodiment corresponds to a digital camera with an arrangement to directly send an automatic print file 301 when performing multiple number of copy printing of the DPOF from the digital camera 200.

Figure 12:
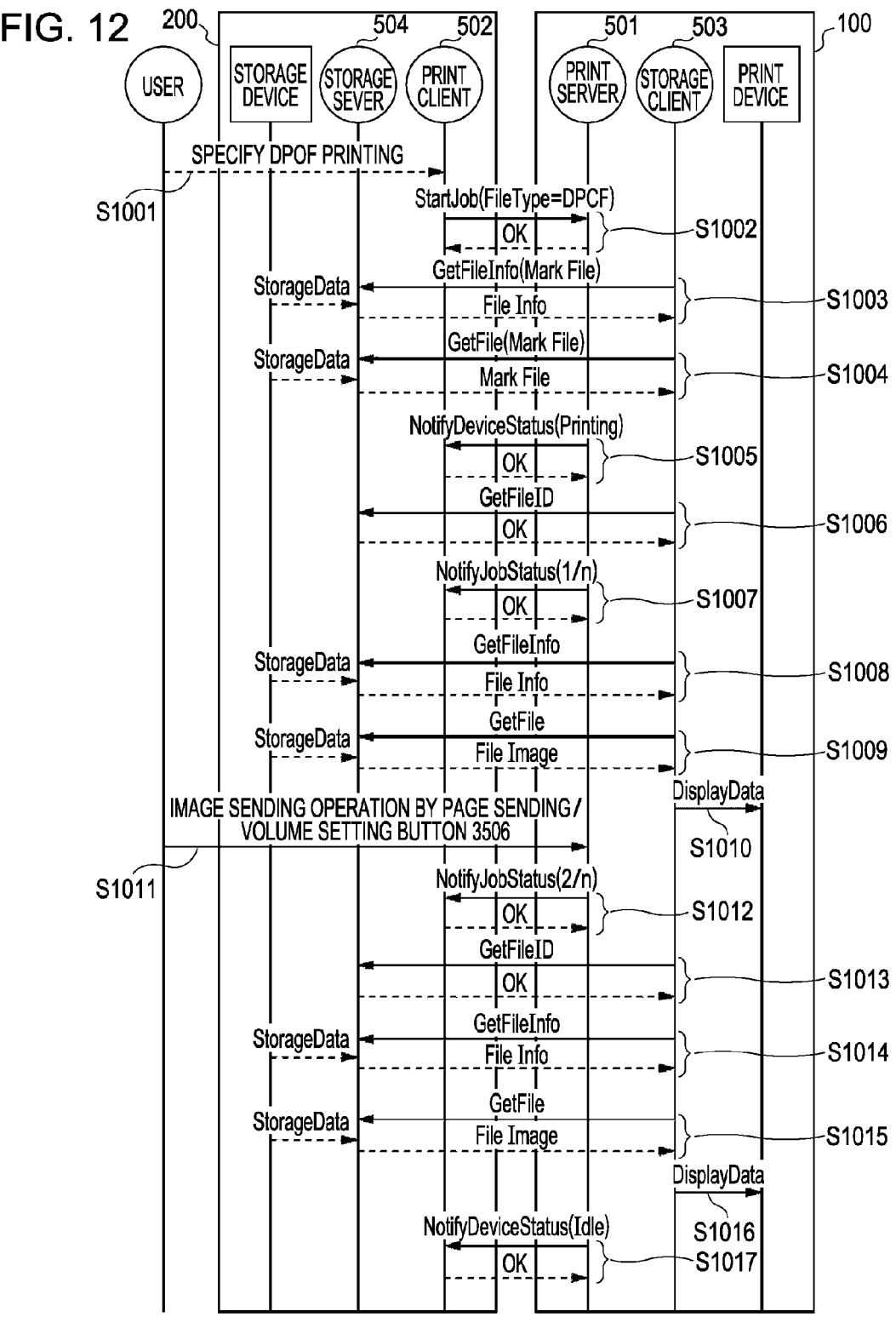
FIG. 12 is a sequence diagram of image switching when an automatic print file is directly transmitted to the liquid crystal projector according to an embodiment.

Let us say that an instruction is given to perform printing according to the DPOF file stored beforehand in the digital camera, from the state wherein the liquid crystal projector 100 and digital camera 200 have established a connection. FIG. 12 is a sequence diagram including the user page sending operation in this case.

The user sets multiple copies of the image to be printed beforehand from the UI of the digital camera 200 and creates a DPOF file (automatic print file 301), and performs an operation to start DPOF printing after connecting to the liquid crystal projector 100.

In step S1002, the Print Client 502 issues a DPS_StartJob 405 to the Print Server 501. The Print Server 501 determines by analyzing the tag of the DPS_StartJob 405 that the type of file transmitted next is an automatic print file 301.

In step S1003, the Storage Client 503 issues a DPS_GetFileInfo 422 to the Storage Server 504 in order to know the file size of the automatic print file 301 beforehand.

In step S1004, the Storage Client 503 issues a DPS_GetFile to the Storage Server 504 in order to obtain the automatic print file 301, and analyzes the content of the automatic print file 301.

In step S1005, the Print Server 501 issues a DPS_NotifyDeviceStatus 409 to the Print client 502 in order to notify of its own state transferring to the printing state.

In step S1006, the Storage Client 503 issues a DPS_GetFileID 420 to the Storage Server 504 in order to obtain a file ID of the image to be displayed first according to the automatic print file 301.

In step S1007, the Print Server 501 issues a DPS_NotifyJobStatus 407 to the Print Client 502 in order to notify which copy is currently subject to display processing of the total image number of copies n specified for printing with the automatic print file 301.

Note that n represents the number of images obtained by analyzing the automatic print file 301. Even if multiple copies of the same image are set for printing, the liquid crystal projector 100 views this as a display of one copy, so if 5 print copies for each of 3 types of images is set, n is 3, not 15.

In step S1008, the Storage Client 503 issues a DPS_GetFileInfo 422 to the Storage Server 504 using the file ID obtained in step S1006, in order to obtain the file type and file size of the image to obtain next.

In step S1009, the Storage Client 503 issues a DPS_GetFile 424 to the Storage Server 504 in order to obtain the image data all at once.

In step S1010, the image file obtained by the Storage Client 503 is sent to the Print Device.

In the event of displaying multiple images with DPOF printing, a page sending operation is performed with a page send/volume setting button 3506 from the remote controller of the liquid crystal projector 100, whereby display can be switched to the next image. Also, even if multiple copy printing setting for the same image is made with a parameter called "PRT QTY" in the automatic print file 306, the liquid crystal projector 100 views this as a display of one copy. Thus, similar to the above-described embodiment, the inconvenience of displaying the same image several times can be prevented.

In step S1011, the user operation of a page sending/volume setting button 3506 of the liquid crystal projector 100 is shown.

In step S1012, the Print Server 501 issues a DPS_NotifyJobStatus 407 to the Print Client 502 in order to notify which copy out of the total image number of copies specified for printing with the automatic print file 301 is currently subject to display processing. In FIG. 12, 2/n indicates notification that the second image of the total image number n is displayed, but in the case that the display is of the third or fourth image, numbers corresponding thereto are notified.

In step S1013, the Storage Client 503 issues a DPS_GetFileID to the Storage Server 504 in order to obtain the file ID of the image to be displayed next, similar to the first image.

In step S1014, the Storage Client 503 issues a DPS_GetFileInfo 422 to the Storage Server 504 in order to obtain the file type and file size of the image to obtain next.

In step S1015, the Storage Client 503 issues a DPS_GetFile 424 to the Storage Server 504 in order to obtain all of the image data at once.

In step S1016, the Storage client 503 sends the image data obtained in step S1015. As long as key operation with the page sending/volume setting button 3506 from the remote controller of the liquid crystal projector 100 is not performed, the display is not switched to the next image. Also, even if multiple copy printing setting for the same image is made with a parameter called "PRT QTY" in the automatic print file 306, the liquid crystal projector 100 views this as a display of one copy.

In step S1017, upon the image display specified by DPOF is completed, the liquid crystal projector 100 transfers to a standby state, and in order to notify the effect thereof, the print server 501 issues a DPS_NotifyDeviceStatus 409 to the Print client 502. If the specified image display is not completed, the sequence above from steps S1013 to S1016 is repeated until the image display is completed.

By performing the above-described processing, even in the case wherein multiple number of copy printing for the same image is set with the automatic print file 301 of DPOF, repeatedly displaying the same image can be prevented. Also, wasteful communication processing and image processing such as displaying the same image several times can be reduced, and waiting time until the next separate image is displayed can be reduced. Also, image switching processing does not have to be performed as to the same image several times, thereby improving operability.

Also, in the case of manually performing operations for image switching using an operating apparatus such as a remote controller, operations to switch the images can be prevented from becoming excessive. In FIG. 12, steps S1002 through S1006 and S1013 are realized with a printing setting communication unit.

Note that DPOF is also only one form of a print setting file, and other print setting files can be used.

In fifth embodiment, an embodiment corresponding to the multiple numbers of copies printing request using a DPOF file, similar to the fourth embodiment, is described. However, in the present embodiment, when multiple number of copy printing with a DPOF file is performed from the digital camera 200, upon the automatic print file 301 being analyzed by the digital camera 200, this is converted to the DPS_StartJob 405 as one print job. The embodiment is arranged to correspond to the digital camera in an arrangement wherein the DPS_StartJob 405 obtained by conversion is sent to the liquid crystal projector 100.

Figure 13:
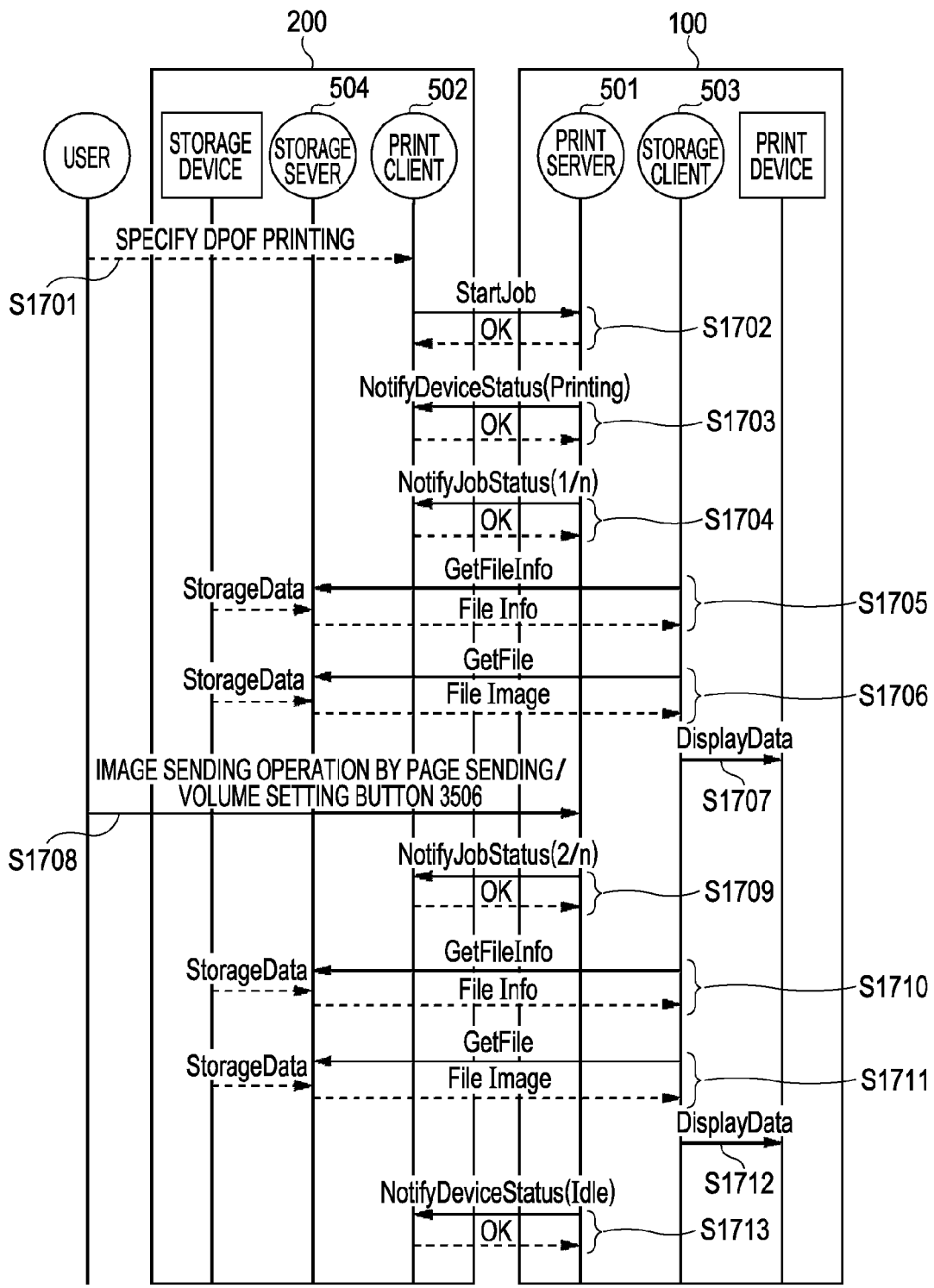
FIG. 13 is a sequence diagram of the digital camera transmitting a print job to the liquid crystal projector after analyzing the automatic print file with DPOF printing according to an embodiment.

FIG. 13 is a sequence diagram wherein the DPOF printing is started with the digital camera 200 from the state wherein a connection between the liquid crystal projector 100 and digital camera 200 is established, the camera analyzes the automatic print file 301 and sends this as one print job, and includes an operation for performing a page sending operation and switch the images displayed by the liquid crystal projector 100.

In step S1701, the user sets multiple copies of the image displayed with the liquid crystal projector 100 from the UI of the digital camera 200, and performs DPOF print start operations.

In step S1702, the Print Client 502 analyzes the print setting described in the automatic print file 301, summarizes this into one job and creates the DPS_StartJob 405, and issues this to the Print Server 501.

In step S1703, the Print Server 501 issues a DPS_NotifyDeviceStatus 409 to the Print Client 502 in order to notify that the Print Server 501 is transferring to a printing state.

In step S1704, the print server 501 issues a DPS_NotifyJobStatus 407 to the Print Client 502 in order to notify which copy of the total image copies specified for printing with the DPS_StartJob 405 is currently subject to display processing.

In step S1705, the Storage Client 503 issues a DPS_GetFileInfo 422 to the Storage Server 504 in order to obtain the file type and file size of the image to be obtained next.

In step S1706, the Storage Client 503 issues a DPS_GetFile 424 in order to obtain all of the image data at once.

In step S1707, the Storage Client 503 sends the obtained image file to the Print Device. Even if there is an image to be displayed next, as long as the page sending operation with the page sending/volume setting button 3506 is not performed from the remote controller of the liquid crystal projector 100, the processing is not transferred to the next image display. Also, even if multiple copy printing setting for the same image is made with a parameter called "PRT QTY" in the automatic print file 306, the liquid crystal projector 100 views this as a display of one copy, and the image displayed after the page sending operation becomes a different image.

Step S1708 indicates a page sending operation by a user with the page sending/volume setting button 3506 key with the remote controller of the liquid crystal projector 100.

In step S1709, the Print Server 501 issues a DPS_NotifyJobStatus 407 to the Print Client 502 in order to notify which copy of the total image copies specified with the DPS_StartJob 405 is currently subject to display processing.

In step S1710, the Storage Client 503 issues a DPS_GetFileInfo 422 to the Storage Server 504 in order to obtain the file type and file size of the image to be obtained next.

In step S1711, the Storage Client 503 issues a DPS_GetFile 424 in order to obtain all of the image data at once.

In step S1712, the Storage client 503 sends the image data obtained in 1711 to the Print Device. As long as the page sending operation is not performed by the page sending/volume setting button 3506 is not performed with the remote controller of the liquid crystal projector 100, the display of the next image does not switch. Also, even if multiple copy printing setting for the same image is made with a parameter called "PRT QTY" in the automatic print file 306, the liquid crystal projector 100 views this as a display of one copy, and the image displayed before/after the page sending operation becomes a different image.

In step S1713, if the image display specified for printing with DPOF is completed, the liquid crystal projector 100 is transferred to a standby state. In order to notify this, the Print Server 501 issues a DPS_NotifyDeviceStatus 409 to the Print Client 502. If the image display is not completed, the sequence from steps S1708 through S1713 described above is repeated until image display is completed.

By performing the above-described processing, having a digital camera 200 which analyzes the DPOF automatic print file 301 and summarizes this into one print job, the user does not have to send pages between the same image with key operations.

According to the techniques in each of the above embodiments, inconveniences in the case of the direct print function on an information processing apparatus such as a digital camera being used to provide display function can be removed. Particularly, even if the number of copies information is set for multiple copies, repeating the same image several times can be prevented. Also, wasteful processing such as displaying the same image several times can be reduced, and the waiting time until a different image is displayed can be reduced. Also, switch processing for the same image does not have to be performed several times, thereby improving the operability thereof.

Also, in the case of manually performing operations for image switching using an operating apparatus such as a remote controller, operations to switch the images can be prevented from becoming excessive.

The image processing apparatus performing display control is described above as one configuration portion made up as an integrated unit with the liquid crystal projector. However, even if configuration is made, as in 4203, wherein an image data or video signal is outputted to the external liquid crystal projector, this is included in the scope of the present invention.

Also, with the above-described embodiments, a liquid crystal projector has been described, but is not restricted to this, and a projection apparatus using a different display device may be used, or a display apparatus such as a plasma display or television may be used.

Note that the present invention is provided by executing the following processing. That is to say, a recording medium wherein a program code realizing functions of the above-described embodiments are recorded can be supplied to a display system or image processing apparatus to which the present invention can be applied. A computer (or CPU, MPU, etc) of such display system or image processing apparatus reads the program code stored in the recording medium to execute the present invention, which is also within the scope of the present invention.

In this case, the program code itself which is read from the recording medium executes the functions of the above-described embodiments, and the program code and storage medium which stores the program code makes up the present invention.

Also, the following can be used as the storage medium to supply the program code. For example, a floppy disk, hard disk, magneto-optical disk, CD-ROM, CD-R, CD-RW, DVD-ROM, DVD-RAM, DVD-RW, DVD+RW, magnetic tape, non-volatile memory card, ROM, and so forth. Also, the program code may be downloaded via a network.

Also, the case wherein the above-described embodiment functions are realized by executing the program code read by the computer is included in the present invention. Additionally, the scope of the present invention encompasses a case wherein part or all of the actual processing is performed by the OS (operating system) running on the computer, based on the instructions of the program code, whereby the above-described embodiment functions are realized.

Further, a case wherein above-described embodiment functions are realized with the following processing is included. That is to say, the program code read from the storage medium is written in a function expansion board inserted into the computer or a function expansion unit connected to the computer. Subsequently, based on the instructions of such program code, the CPU or the like associated with the function expansion board or function expansion unit actually performs part or all of the processing.

The present invention is not restricted to the above-described embodiments; rather, various modifications may be made within the scope of the Claims.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-059495 filed Mar. 10, 2008, which is hereby incorporated by reference herein in its entirety.

What is claimed is:

1. An image processing apparatus comprising:
a storage unit configured to store print information including image specifying information specifying a plurality of images to be printed and number of copies information to specify the number of copies to be printed;
an output unit configured to sequentially output images according to the print information stored in the storage unit, wherein the output unit sequentially output images specified with the image specifying information;
a receiving unit to communicate with a digital camera to receive the image specifying information and the number of copies information; and
a sending unit to send a send request for an image specified with the image specifying information to the digital camera;
wherein, for an image specified with the number of copies information to print more than one number of copies, the output unit does not output the image according to the number of copies information but outputs following image specified with the image specifying information after outputting the image once,
wherein when the output unit receives an image according to the request sent by the sending unit, the output unit outputs the image received from the digital camera.

2. The image processing apparatus according to claim 1, wherein, in the case that two or more copies are set as the number of copies information, the number of copies information is converted to one copy, or the number of copies information is ignored.

3. The image processing apparatus according to claim 1, wherein the output unit outputs images to a display apparatus, wherein the display apparatus is a display or a projector.

4. The image processing apparatus according to claim 3, wherein the image processing apparatus is configured to integrate with the display apparatus.

5. The image processing apparatus according to claim 1, wherein the output unit outputs the following image specified with the print information in response to a user's operation.

6. The image processing apparatus according to claim 1, wherein the print information is used for printing the images specified with the image specifying information in the number of copies specified with the number of copies information.

7. The image processing apparatus according to claim 1, wherein the printing information is individually specifiable for each of the images specified with the image specifying information in the number of copies information.

8. An image processing method comprising:
- a storage process to store, in memory, print information including image specifying information specifying a plurality of images to be printed and number of copies information to specify the number of copies to be printed;
- an output process to sequentially output images according to the print information stored, wherein images specified with the image specifying information are sequentially outputted;
- communicating with a digital camera to receive the image specifying information and the number of copies information; and
- sending a send request for an image specified with the image specifying information to the digital camera;
- wherein, for an image specified with the number of copies information to print more than one number of copies, the image according to the number of copies information is not outputted but outputs following image specified with the image specifying information after outputting the image once,
- wherein when receiving an image according to the request sent, outputting the image received from the digital camera.

* * * * *